(12) United States Patent
Nakamura et al.

(10) Patent No.: US 7,110,878 B2
(45) Date of Patent: Sep. 19, 2006

(54) METHOD AND APPARATUS FOR MEASURING EXHAUST GAS FLOW RATE AND IT'S APPLICATION SYSTEM FOR ANALYZING THE EXHAUST GASES FROM AN ENGINE

(75) Inventors: Hiroshi Nakamura, Kyoto (JP); Masayuki Adachi, Kyoto (JP); Ichiro Asano, Kyoto (JP); Jiro Senda, Kyoto (JP); Shintaro Aoki, Kyoto (JP)

(73) Assignee: Horiba, Ltd., Kyoto (JP)

( * ) Notice: Subject to any disclaimer, the term of this patent is extended or adjusted under 35 U.S.C. 154(b) by 199 days.

(21) Appl. No.: 10/919,925

(22) Filed: Aug. 17, 2004

(65) Prior Publication Data

US 2005/0080550 A1 Apr. 14, 2005

(30) Foreign Application Priority Data

Aug. 18, 2003 (JP) ............................. 2003-294239
Oct. 15, 2003 (JP) ............................. 2003-355690

(51) Int. Cl.
*G01M 15/00* (2006.01)
*G06F 19/00* (2006.01)

(52) U.S. Cl. ..................................... 701/114; 73/118.1

(58) Field of Classification Search ................ 701/102, 701/108, 109, 114; 60/602, 607, 608; 123/568.21, 123/568.27; 73/117.3, 118.1, 118.2
See application file for complete search history.

(56) References Cited

U.S. PATENT DOCUMENTS

| 4,264,961 | A | 4/1981 | Nishimura et al. | |
|---|---|---|---|---|
| 5,613,479 | A | 3/1997 | Gates et al. | |
| 6,138,504 | A | 10/2000 | Lewis et al. | |
| 6,553,764 | B1 * | 4/2003 | Gladden et al. | 60/608 |
| 6,718,768 | B1 * | 4/2004 | Shaffer | 60/607 |

* cited by examiner

Primary Examiner—Hieu T. Vo
(74) Attorney, Agent, or Firm—Brooks Kushman P.C.

(57) ABSTRACT

A differential pressure type emission flow rate measuring method and apparatus and an emission measuring system are capable of correcting measuring error occurring due to pulsation appropriately and enhancing the measuring precision of flow rate. In measuring the flow rate of an emission exhausted from an engine, an accurate flow rate in spite of pulsation is determined by using a differential pressure type flowmeter. The detected differential pressure signal is resolved by frequency, and is corrected by using a correction coefficient predetermined depending on each frequency obtained by frequency resolution.

17 Claims, 14 Drawing Sheets

METHOD AND APPARATUS FOR MEASURING EXHAUST GAS FLOW RATE AND IT'S APPLICATION SYSTEM FOR ANALYZING THE EXHAUST GASES FROM AN ENGINE

BACKGROUND OF THE INVENTION

1. Field of the Invention

The present invention relates to a method and apparatus for measuring exhaust gas flow rate and it's application system for analyzing the exhaust gases from automotive engine or the like. Particularly, the invention relates to a method and apparatus being capable of correcting an error caused by pulsation of flow rate by using differential pressure type flow meter, for example, the Pitot tube flow meter or the like. Moreover, backward flow rate of the above mentioned gases also distinctly can be measured by the invention.

2. Background Art

A Pitot tube flowmeter is one of differential pressure type flowmeters for measuring flow rate of emission flowing in an exhaust pipe. In this Pitot tube flowmeter, gas flow rate converted to standard state Qpit(t) [m³/min] is given in the following formula (1). In the description of the invention below, (t) is added to the sign showing a time series value by time t, and, for example, gas flow rate is expressed as Qpit(t).

$$Qpit(t) = K \times \sqrt{[\{Pg(t)/1013\} \times \{293.15/Tg(t)\} \times \{Pd(t)/\gamma g\}]} \quad (1)$$

where K: proportional coefficient
Pg(t): gas pressure [κ Pa]
Tg(t): gas temperature [K]
Pd(t): differential pressure
γg: gas density in standard state [g/m³]

That is, when proportional coefficient K is determined preliminarily, from the measured values of temperature and pressure of emission flowing in the pipe and the differential pressure in the Pitot tube, the flow rate of the emission can be obtained.

The Pitot tube flowmeter is used in measurement of flow rate of emission from an engine, but the engine emission is known to generate pulsation in its exhaust pressure. The pulsation is an intrinsic problem of engine emission, and it has been attempted to elucidate radically the mechanism and effects of pulsation in various fields. When measuring continuously the flow rate of engine emission by using the Pitot tube flowmeter, since the emission pressure (differential pressure) is measured directly, if pulsation occurs, its effect is directly applied, and the measuring error may be increased.

FIG. 8 is a diagram showing the ratio of measured value of flow rate of gas having pressure fluctuations measured by using a Pitot tube and true value of gas flow rate. FIG. 9 is a diagram showing output waveform of flow rate measured by using the Pitot tube, in which an example of measurement at a constant flow rate is shown. Herein, a short cylinder engine different in displacement is connected to the gas passage, and pressure fluctuations are caused by rotating this short cylinder engine. As shown in FIGS. 8 and 9, when a pulsation of a certain frequency is applied to the gas flow, a large difference is caused between the measured value by the Pitot tube flowmeter and the true value of gas flow rate, and as the pulsation amplitude is larger, it is known that the difference is increased between the measured value by the Pitot tube flowmeter and the true value of gas flow rate.

Although pulsation at high frequency are removed by catalyst tube or muffler, when pulsation at low frequency are caused during idling of the engine or the like, pulsation frequency is lowered, and the Pitot tube flowmeter is strongly influenced by pulsation, and the error is increased.

As proposed, for example, in Japanese Laid-open Patent No. H10-318810, to decrease pulsation effects of engine, it has been attempted to install a buffer tank for absorbing pulsation of emission at the upstream side of the exhaust tube having the flowmeter, or to vary the capacity of the buffer tank depending on the rotating speed of the engine, thereby varying the frequency of the pulsation to be decreased. While the engine is idling, without using the output of the flow rate measured by the Pitot tube flowmeter, a certain preset fixed value may be used.

In any of the conventional measuring methods, the flow rate of emission exhausted from the engine could not be measured in-situ. That is, when using the fixed value instead of the measured value in idling state, since the fixed value completely ignoring the measured value of differential pressure is outputted in idling state, the flow rate of emission exhausted in idling state cannot be measured at all.

Further, as disclosed in Japanese Laid-open Patent No. H10-318810, when the buffer tank is installed at the upstream side of the exhaust tube, it is not only difficult to remove pulsation completely, but also the apparatus is complicated and increased in size because it is required to form a buffer tank of variable capacity and install a mechanism for varying the capacity of the buffer tank depending on the engine rotating speed. By using the buffer tank, since the pulsation is decreased by adjusting the flow rate of the emission to be measured, the flow rate (to be measured) having pulsation cannot be measured in-situ.

The invention is devised in the light of the above problems, and it is hence an object thereof to present a differential pressure type emission flow rate measuring method and emission flow rate measuring apparatus capable of correcting measuring error occurring due to pulsation appropriately and enhancing the measuring precision of flow rate when measuring the flow rate of emission having pulsation.

A Pitot tube flowmeter is known as one of differential pressure type flowmeters for continuously measuring flow rate of emission exhausted from an automotive engine and flowing in an exhaust pipe. In this Pitot tube flowmeter, emission flow rate converted to standard state Q(t) [m³/min] is given in the following formula (6).

$$Q(t) = \alpha \times \sqrt{\frac{P(t)}{101.3} \times \frac{293.15}{T(t)} \times \frac{\Delta P(t)}{\rho}} \quad (6)$$

where α: proportional constant
ΔP(t): differential pressure of Pitot tube [kpa]
P(t): emission pressure [kpa]
T(t): emission temperature [K]
ρ: emission density in standard state [g/m³]

That is, when proportional constant α is determined preliminarily, from the measured values of temperature and pressure of emission flowing in the pipe and the differential pressure in the Pitot tube, the flow rate of the emission can be obtained.

However, the Pitot tube flowmeter is known to have effects of pulsation of emission, and it is warned that the measuring error of emission flow rate increases due to so-called square root error occurring when calculating the emission flow rate from the differential pressure.

Accordingly, as disclosed in Japanese Laid-open Patent No. H10-318810, it has been attempted to use an apparatus for measuring the flow rate of emission by using a differential pressure sensor of flowmeter (Annubar flowmeter) while suppressing pulsation of emission by the buffer tank.

Further, as disclosed in Japanese Laid-open Patent No. 2000-46612, by processing the piping, a space filter is composed, and the pulsation frequency is determined, or as disclosed in Japanese Laid-open Patent No. 2001-208584, the pulsation frequency is determined by using an ultrasonic flowmeter.

However, in the emission flow rate measuring apparatus disclosed in Japanese Laid-open Patent No. H10-318810, the field of measurement is varied, by absorbing pulsation of emission by the buffer tank, it cannot be measured in-situ. Such technique is not suited to the present situation and future demand because elucidation of pulsation itself and transient measurement are demanded. It is also impossible to eliminate pulsation of emission completely by the buffer tank, and it further requires to form a buffer tank of variable capacity and mechanism for varying the capacity of buffer tank depending on the engine rotating speed, and the apparatus itself becomes complicated and larger in size. In the gas flow measuring apparatus disclosed in Japanese Laid-open Patent No. 2000-46612, or in the flow rate measuring apparatus disclosed in Japanese Laid-open Patent No. 2001-208584, the apparatus itself is large and complicated.

On the other hand, the Pitot tube flowmeter is designed to calculate the emission flow rate by making use of the proportional relation of the emission flow rate and square root of differential pressure as shown in formula (6), and hence the differential pressure and the emission flow rate are in the relation graphically shown in FIG. 16. In FIG. 16, the axis of abscissas denotes the differential pressure [kPa], and the axis of ordinates represents the flow rate [L/min]. According to the studies by the present inventors, the differential pressure changes in the time course along with pulsation of emission, and at the time of pulsation a in FIG. 16, for example, if the response frequency of the differential pressure sensor for detecting the differential pressure of the Pitot tube is low, measured values of differential pressure are averaged, and the emission flow rate (about 1300 L/min in FIG. 16) corresponding to the averaged measured value of differential pressure (e.g. about 1.4 kPa in FIG. 16) is obtained, and thus obtained emission flow rate is found to be higher than the accurate emission flow rate (about 1150 L/min in FIG. 16) obtained by averaging after converting the differential pressure into emission flow rate.

The invention is based on the above-mentioned findings, and it is hence other object thereof to present an emission flow rate measuring method and apparatus and an emission measuring system using the same apparatus, capable of measuring the flow rate of emission exhausted from an engine in real time and at high precision even in the event of pulsation, without changing the field of measurement, and also capable of reducing in size easily.

SUMMARY OF THE INVENTION

To achieve the object, the emission flow rate measuring method as comprehended by the invention in one aspect is a method of measuring the flow rate of an emission exhausted from an engine characterized by using a differential pressure type flowmeter as the flowmeter, resolving the detected differential pressure signal by frequency, correcting by using a correction coefficient predetermined depending on each frequency obtained by frequency resolution, and determining an accurate flow rate in spite of pulsation.

The emission flow rate measuring method as comprehended by the invention in another aspect is a method of measuring the flow rate of an emission exhausted from an engine characterized by using a differential pressure type flowmeter as the flowmeter, resolving the detected differential pressure signal by frequency, correcting by using a correction coefficient predetermined on the basis of the frequency obtained by frequency resolution and the amplitude, and determining an accurate flow rate in spite of pulsation.

In this aspect, in a passage of emission, a gas varying in pressure at different frequency and amplitude may be applied to flow, and the flow rate determined from the differential pressure signal of the gas flowing in the emission passage may be compared with the flow rate of actually flowing gas, then the correction coefficient may be obtained.

The emission flow rate measuring method as comprehended by the invention in another aspect is a method of measuring the flow rate of an emission characterized by using a total pressure detector and a static pressure detector provided in a passage of emission exhausted from an engine, and a differential pressure sensor connected to the total pressure detector and static pressure detector, in which when the differential pressure signal of the differential pressure sensor is negative, the square root of the absolute value of differential pressure signal is multiplied by –1, and this product is used in calculation of emission flow rate including counterflow.

That is, in formula (6), if ΔP<0, formula (6) is replaced by formula (7).

$$Q(t) = \alpha' \times \sqrt{\frac{P(t)}{101.3} \times \frac{293.15}{T(t)} \times \frac{|\Delta P(t)|}{\rho}} \quad (7)$$

where α': proportional constant

|ΔP(t)|: absolute value of differential pressure of Pitot tube [kPa]

The emission flow rate measuring apparatus as comprehended by the invention in one aspect comprises a differential pressure gauge for detecting the differential pressure of emission flowing in an emission passage, and an arithmetic processing unit for resolving the differential pressure signal detected by the differential pressure gauge by frequency, and correcting the flow rate by using a correction coefficient predetermined depending on each frequency obtained by frequency resolution.

The emission flow rate measuring apparatus as comprehended by the invention in another aspect comprises a differential pressure gauge for detecting the differential pressure of emission flowing in an emission passage, and an arithmetic processing unit for resolving the differential pressure signal detected by the differential pressure gauge by frequency, and correcting the flow rate by using a correction coefficient predetermined on the basis of the frequency obtained by frequency resolution and the amplitude.

The apparatus may also comprise a pulsation generation device provided in an emission passage for generating pressure fluctuations at different frequency and amplitude sequentially in the gas flow, an arithmetic processing unit for determining a correction coefficient by comparing the flow rate determined from the differential pressure signal detected in a pressure fluctuation generated state and the flow rate of actually flowing gas, and a storage unit for storing the correction coefficient.

To achieve the object, the emission flow rate measuring apparatus as comprehended by the invention in another aspect comprises a total pressure detector and a static pressure detector provided in a passage of emission exhausted from an engine, and a differential pressure sensor connected to the total pressure detector and static pressure detector, in which the differential pressure sensor outputs a differential pressure signal at a frequency higher than pulsation frequency of emission, and the emission flow rate is calculated from this differential pressure signal.

The emission flow rate measuring apparatus as comprehended by another aspect of the invention comprises a total pressure detector and a static pressure detector provided in a passage of emission exhausted from an engine, and a differential pressure sensor connected to the total pressure detector and static pressure detector, in which the differential pressure sensor outputs a differential pressure signal at a frequency higher than pulsation frequency of emission while the engine is idling, and the emission flow rate is calculated from this differential pressure signal.

The emission flow rate measuring apparatus as comprehended by another aspect of the invention comprises a total pressure detector and a static pressure detector provided in a passage of emission exhausted from an engine, and a differential pressure sensor connected to the total pressure detector and static pressure detector, in which when the differential pressure signal of the differential pressure sensor is negative, the square root of the absolute value of differential pressure signal is multiplied by −1, and this product is used in calculation of emission flow rate including counterflow.

The differential pressure sensor is preferably a semiconductor differential pressure sensor.

A response difference adjusting mechanism may be provided between the total pressure detector and differential pressure sensor and/or the static pressure detector and differential pressure sensor.

The response difference adjusting mechanism may be buffer tank, capillary or throttle valve.

A communicating part may be provided between the total pressure detector and differential pressure sensor and/or the static pressure detector and differential pressure sensor, and this communicating part is formed of a piping of length of 20 m or less and inside diameter of 1.0 to 50 mm.

Preferably, the differential pressure indicated by the differential pressure signal is once converted into a flow rate, and is averaged, so that the average flow rate of emission is determined.

This emission flow rate measuring apparatus may be composed as a car-mount type.

To achieve the object, the emission measuring system as comprehended by one aspect of the invention comprises an emission flow rate measuring apparatus.

In the emission flow rate measuring method as comprehended by the invention, it is not intended to eliminate or decrease the pulsation included in the detected differential pressure signal, but by resolving pulsation by frequency and correcting according to the frequency of pulsation, the error caused by pulsation can be corrected.

More specifically, if the differential pressure type flowmeter outputs a different indication from the actual flow rate due to effects of pulsation to a detection value of differential pressure caused by flow of emission, the measuring error can be corrected by adjusting (lowering) the offset appearing in the differential pressure signal by the portion of matching to the correction coefficient depending on the frequency of the generated pulsation, and therefore the precision of measurement of flow rate of differential pressure type can be enhanced. Correction of measuring error is not limited to adjustment of offset of differential pressure signal, but, for example, the differential pressure signal or measured value of flow rate may be multiplied by the correction coefficient.

Therefore, in the emission flow rate measuring method of the invention, not removing the pulsation included in the detected differential pressure signal, the flow rate can be measured accurately in-situ including this pulsation, and it is effective for analyzing the cause and effect of pulsation. Unlike the prior art, the invention does not require large buffer tank for changing the capacity depending on the engine rotating speed, resonator, engine rotation measuring device, or other external hardware for adjusting the flow of emission, but all can be calculated by using the differential pressure signal detected by the differential pressure gauge side, so that a simple and inexpensive apparatus can be presented.

In low speed state, for example, while the engine is idling, an accurate flow rate including pulsation can be measured, and unlike the prior art, it is not required to detect the engine idling state and output a specified fixed value instead of the measured value of flow rate, and hence mechanism for detecting engine idling state is not needed. Above all, it is a great merit that the flow rate can be always detected accurately in-situ regardless of the rotating speed of the engine.

In the emission flow rate measuring method as further comprehended by the invention, by resolving pulsation included in the detected differential pressure signal by frequency, a composite correction coefficient at this time is determined by using the correction coefficient obtained on the basis of the frequency determined by this frequency resolution and the amplitude, and by correcting by using this composite correction coefficient, errors caused by any pulsation can be corrected securely.

Therefore, in the emission flow rate measuring method of the invention, not removing the pulsation included in the detected differential pressure signal, the flow rate can be measured accurately in-situ including this pulsation. Without need for adjusting the flow of emission by using external hardware, all can be calculated by using the differential pressure signal detected by the differential pressure gauge side, so that a simple and inexpensive apparatus can be presented. In low speed state, for example, while the engine is idling, an accurate flow rate including pulsation can be measured, and the flow rate can be always measured accurately in-situ.

In a passage of emission, a gas varying in pressure at different frequency and amplitude may be applied to flow, and the flow rate determined from the differential pressure signal of the gas flowing in the emission passage may be compared with the flow rate of actually flowing gas, and a correction coefficient corresponding to the frequency and amplitude may be obtained, and in this case since the correction coefficient corresponding to the amplitude of each frequency component of pulsation is determined, more accurate correction may be possible.

As further comprehended by the invention, when the differential pressure signal is negative, it means counterflow, and by calculating the flow rate of emission by multiplying the square root of the absolute value of differential pressure signal by −1, the counterflow generated in the passage of emission can be recognized and taken out as counterflow.

In the differential pressure type emission flow rate measuring apparatus as comprehended by the invention, without eliminating the pulsation caused in the flow rate to be measured, the measuring error caused by this pulsation can be corrected. Therefore, the differential pressure type flow rate detecting apparatus does not require large buffer tank for changing the capacity depending on the engine rotating speed, resonator, engine rotation measuring mechanism, or other external hardware, but it is enough to correct the differential pressure signal detected by the differential pressure gauge by using the arithmetic processing unit. That is, by the operation on the software only, an accurate flow rate can be outputted, and the manufacturing cost of the emission flow rate measuring apparatus can be lowered.

In low speed state, for example, while the engine is idling, an accurate flow rate including pulsation can be detected, and unlike the prior art, it is not required to modify the flow rate of gas to be measured by using a buffer tank of variable capacity, or output the fixed value by ignoring the measured value by the differential pressure gauge, and hence the measured value of accurate flow rate can be always outputted regardless of the engine rotating speed, so that the original purpose of flow rate detecting apparatus can be realized securely.

In the differential pressure type emission flow rate measuring apparatus as further comprehended by the invention, only by processing on the software of correcting the differential pressure signal detected by the differential pressure gauge by using the arithmetic processing unit, the measuring error caused by pulsation can be corrected. Therefore, the differential pressure type flow rate detecting apparatus does not require external hardware, and the manufacturing cost of emission flow rate measuring apparatus can be lowered, and it is also easy to adjust.

Besides, by correcting depending on the frequency and amplitude of pressure fluctuations, correction of higher precision is realized, and the reliability of measured results is enhanced. In particular, even when the engine is idling, that is, in low speed state, accurate flow rate including pulsation can be detected, and hence the measured value of accurate flow rate can be always outputted regardless of the engine rotating speed, so that the original purpose of flow rate detecting apparatus can be realized securely.

The apparatus may also comprise a pulsation generation device provided in an emission passage for generating pressure fluctuations at different frequency and amplitude sequentially in the gas flow, an arithmetic processing unit for determining a correction coefficient by comparing the flow rate determined from the differential pressure signal detected in a pressure fluctuation generated state and the flow rate of actually flowing gas, and a storage unit for storing the correction coefficient corresponding to the frequency and amplitude, and in this case since the correction coefficient corresponding to the frequency component of each pulsation and its amplitude can be determined, the correction is more accurate.

The correction coefficient is required to be measured and determined only once at the time of manufacture in every differential pressure flowmeter, and therefore, at the manufacturer's side, by measuring the correction coefficient and storing it in the storage unit by using the differential pressure type flow rate detecting apparatus having pulsation generating device, the pulsation generating device is not needed in the differential pressure type flow detecting apparatus at the user's side. Therefore, the user can detect the flow rate correctly only by using the correction coefficient suited to the differential pressure type flowmeter out of the plural correction coefficients stored in the storage unit of the differential pressure type flow rate detecting apparatus, and does not have to make correction coefficient anew by using a pulsation generating device in every differential pressure gauge.

Incidentally, when using only one differential pressure gauge, it is not required to store plural correction coefficients or select one correction coefficient out of them. The storage unit for storing correction coefficients is desired to be attached to the differential pressure gauge side as a memory chip, so that the correction coefficient suited to the differential pressure gauge may be selected automatically. The storage unit may be realized by flexible disk, CD-ROM, memory card, etc. Further, the correction coefficient may be recorded in a programmable storage unit by transferring by using communication means such as the Internet.

According to the invention in another aspect it is possible to obtain an emission flow rate measuring apparatus capable of measuring the flow rate of emission exhausted from an engine, in real time and at high precision even in the event of pulsation, without changing the field of measurement, and also capable of reducing in size easily.

More specifically, for example, when the response frequency of the differential pressure sensor for detecting the differential pressure at the time of pulsation of emission is lower than the pulsation frequency, as mentioned above, the detected differential pressure is averaged, and the measuring error increases, but in the invention in this aspect, it is designed to detect the differential pressure between the static pressure and total pressure at the response frequency of higher than the pulsation frequency of the emission, and averaging of the detected differential pressure is suppressed, so that the flow rate of emission may be measured at high accuracy.

Also in the invention in this aspect, without suppressing the pulsation of emission by using buffer tank or the like and without changing the field of measurement, the flow rate of emission is measured in-situ.

Further, in the invention in this aspect, principal parts can be composed of an ordinary Pitot tube and a differential pressure sensor of which response frequency is higher than the pulsation frequency, and the Pitot tube is small and compact and the differential pressure sensor is reduced in size by etching cavity, so that the entire apparatus can be easily reduced in size.

According to another aspect of the invention, the differential pressure signal is negative, it means counterflow, and the square root of the absolute value of differential pressure signal is multiplied by −1, and this product is used in calculation of emission flow rate, and the counterflow generated in the passage of emission can be recognized and taken out as counterflow.

According to another aspect of the invention, when the differential pressure sensor is made of a semiconductor differential pressure sensor, the apparatus is reduced in size more easily.

According to another aspect of the invention, when a response difference adjusting mechanism is provided, it is possible to eliminate error due to difference in response time between the total pressure and the static pressure to be detected by the differential pressure sensor.

According to another aspect of the invention, when the response difference adjusting mechanism is composed of buffer tank, capillary, or throttling valve, the response difference adjusting mechanism is simple in structure and is inexpensive.

In another aspect, when the communicating part is made of a piping of 20 m or less in length and 1.0 to 50 mm in inside diameter, buffering of differential pressure by pulsation can be securely prevented by the communicating part.

In another aspect, by converting the differential pressure indicated by the differential pressure signal into a flow rate and then averaging, the average flow rate of emission can be determined, and the measured value of the emission flow rate is extremely precise.

In another aspect, when the emission flow rate measuring apparatus of the invention is of car-mount type, it is possible to measure not only the flow rate of emission from an automobile running by simulation on chassis dynamo, but also the flow rate of emission from an actually running automobile, and more useful data about emission flow rate can be collected.

In another aspect, part of emission can be sampled at high precision and high repeatability by using mini diluter method, and the emission measuring system is capable of calculating not only the concentration but also the mass of each component of emission at high precision. The measured value of emission flow rate at high precision can be obtained in real time by the emission flow rate measuring apparatus, and this measured value of emission flow rate can be effectively utilized in the mini dilute method which requires an accurate and real-time measured value of emission flow rate, and in the gas analyzer which requires an accurate and real-time measured value of emission flow rate when calculating the mass from the concentration of the emission.

DETAILED DESCRIPTION OF THE PREFERRED EMBODIMENTS

Figure 1:
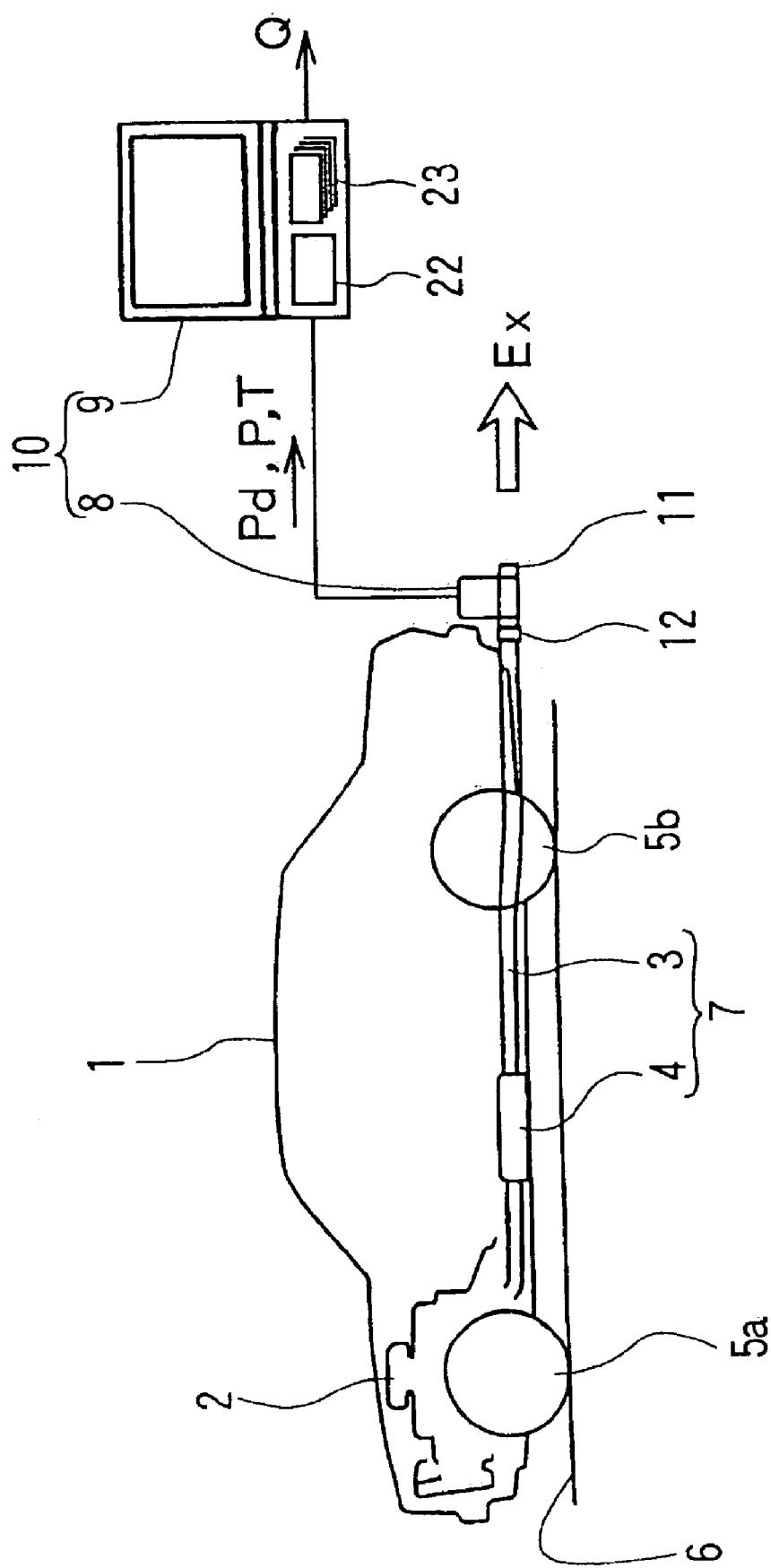
FIG. 1 is an overall structural diagram of a preferred embodiment of a differential pressure type flow rate detecting apparatus.
Figure 2:
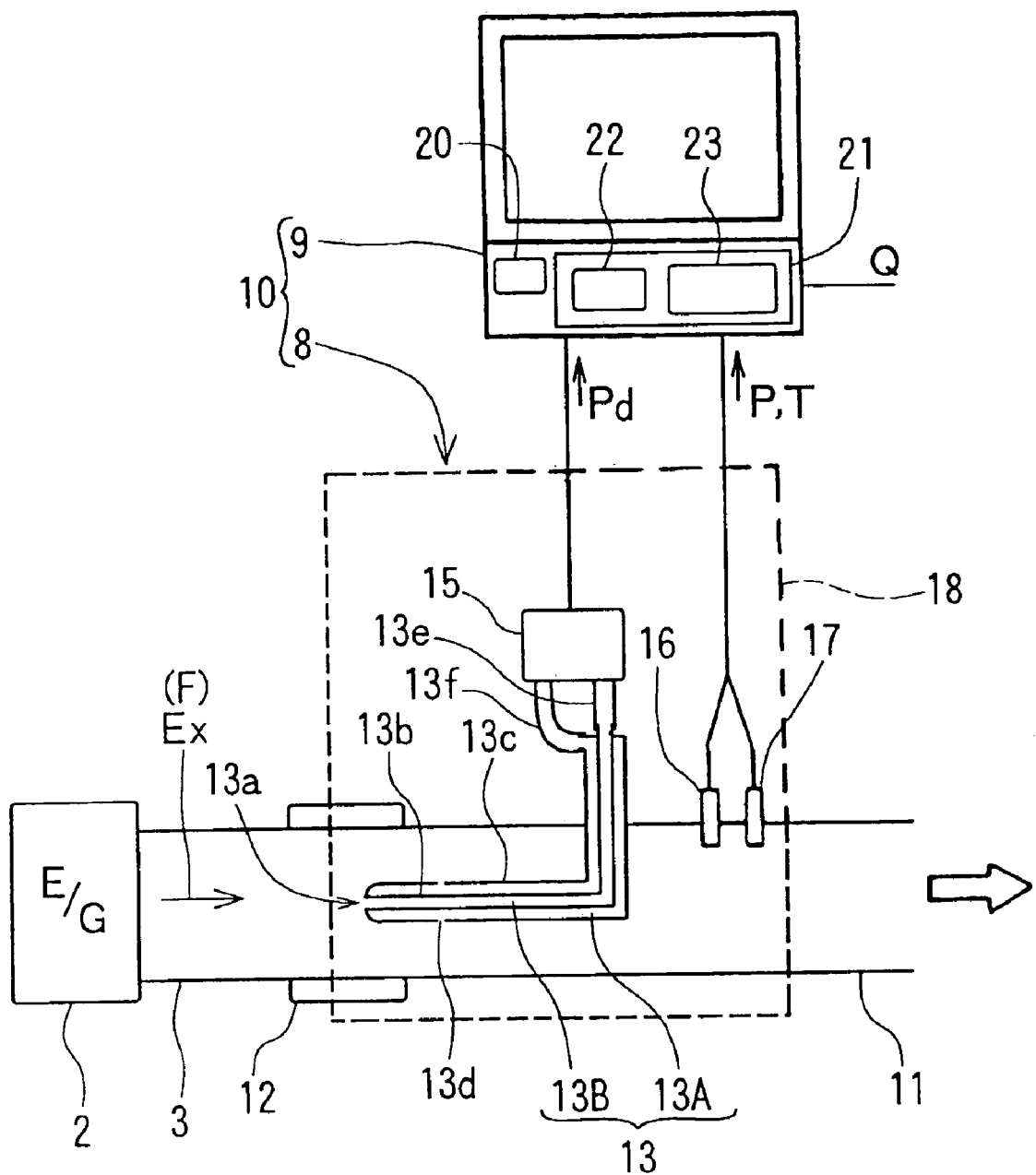
FIG. 2 is an essential magnified view of the differential pressure type flow rate detecting apparatus.

A preferred embodiment of the invention is described below while referring to the accompanying drawings. FIG. 1 is a diagram showing an example of measurement of flow rate of emission of an automobile by using a differential pressure type flow rate detecting apparatus of the invention, and FIG. 2 is an essential magnified view of the differential pressure type flow rate detecting apparatus.

In FIG. 1, reference numeral 1 is an automobile to be measured (including various types of vehicles, and called a vehicle hereinafter), 2 is an engine of the vehicle 1, 3 is an exhaust pipe as an example of flowing passage of emission Ex linked to the engine 2, and 4 is a catalyst device provided in the exhaust pipe 3. Further, reference numerals 5a, 5b are front and rear wheels, and 6 is a road surface. The exhaust pipe 3 and catalyst device 4 are parts for composing the exhaust system 7 of the vehicle 1, and the exhaust system 7 is determined according to the type of the vehicle 1.

Reference numeral 8 is a Pitot tube differential pressure flowmeter as an example of differential pressure gauge for detecting the differential pressure caused by the flow rate of emission Ex flowing in the exhaust pipe 3 by using a Pitot tube described below, being detachably provided at the downstream end of the exhaust pipe 3, and 9 is an arithmetic processing unit for processing the differential pressure signal Pd obtained by this differential pressure gauge 8 and calculating and outputting the flow rate Q (flow rate signal) of emission Ex. Reference numeral 10 is a differential pressure type flow rate detecting apparatus of the preferred embodiment, being composed of differential pressure gauge 8 and arithmetic processing unit 9.

In this example, it is shown that the arithmetic processing unit 9 outputs a flow rate signal Q, and by multiplying this flow rate signal Q by, for example, the concentration signal of the component to be measured contained in the emission Ex measured by a gas analyzer, the emission amount of the component to be measured can be obtained. In the invention, however, the structure of the arithmetic processing unit 9 outputting sole flow rate signal Q to outside is not always required, and it is only required that the flow rate Q can be determined in the internal arithmetic processing. The differential pressure gauge is not limited to Pitot tube type differential pressure gauge, but a Venturi type differential pressure gauge lay be also used.

FIG. 2 shows a magnified structure of the differential pressure type flow rate measuring apparatus 10. In FIG. 2, reference numeral 11 is an adapter pipe detachably connected at the downstream end of the exhaust pipe 3, and it has a same inside diameter as the exhaust pipe 3, and at its upper end side, there is a connection part 12 with the downstream end of the exhaust pipe 3, and its downstream side is opened.

Inside the adapter pipe 11, there is a Pitot tube 13 of double tube structure consisting of two tubes 13b, 13c disposed concentrically, which so that bent nearly in an L-shape its leading end 13a is toward the upstream side of the flow F of emission Ex. The passage between the two tubes 13b, 13c is sealed in the leading end 13a, and a hole 13d is opened so as to face the flow F of emission Ex at its side. That is, the Pitot tube 13 of the embodiment forms a Pitot tube for detection of static pressure 13A between the tubes 13b and 13c, and also forms a Pitot tube for detection of dynamic pressure 13B by the inside tube 13b. These Pitot tubes 13A, 13B are connected to a differential pressure sensor 15 by way of communicating pipes 13e, 13f, and by this differential pressure sensor 15, the differential pressure (differential pressure signal) Pd by flow F of emission Ex obtained as a measured value.

Reference numerals 16 and 17 are temperature sensor and pressure sensor inserted in the pipe of the adapter pipe 11 at the downstream side of the Pitot tube for detection of dynamic pressure 13B, which respectively measure the temperature T and pressure P of the emission Ex. Output signals Pd, T, P from the differential pressure sensor 15, temperature sensor 16, and pressure sensor 17 are fed into the arithmetic processing unit 9, and are used for correcting the flow rate to the value in standard state. Reference numeral 18 is a case for accommodating the members 13 to 17, and is detachably provided in the adapter pipe 11 by proper means.

The arithmetic processing unit 9 processes the signals Pd, T, P and determines the flow rate Q at this time, and the arithmetic processing unit 9 comprises at least a CPU 20 and a storage unit 21, and an arithmetic processing program 22 recorded in the storage unit 21 is executed by the CPU 20, and by properly processing the signals Pd, T, P, the flow rate Q is determined.

Figure 8:
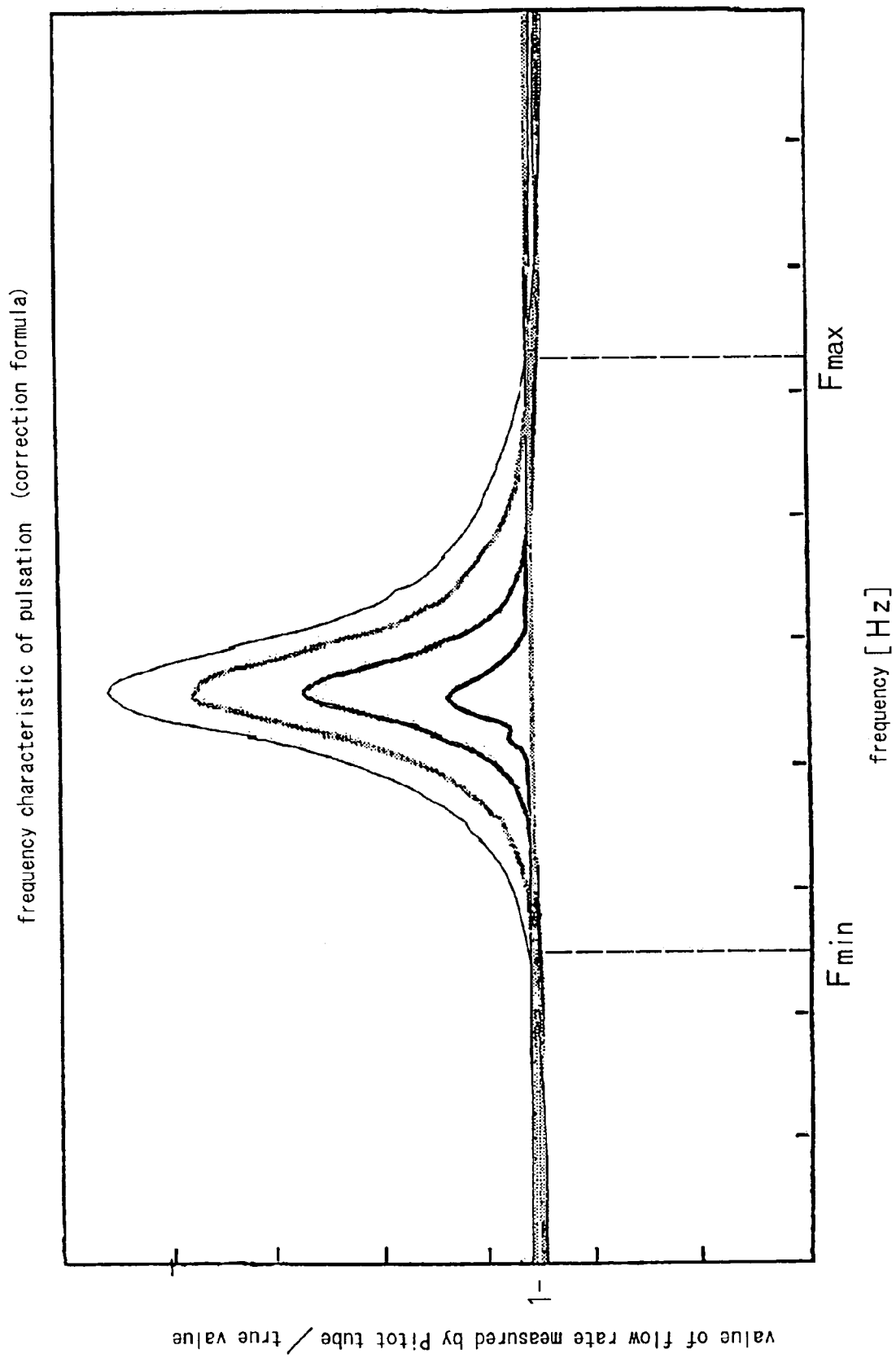
FIG. 8 is a diagram showing the relation of frequency and emission flow rate (characteristic curve)
Figure 9:
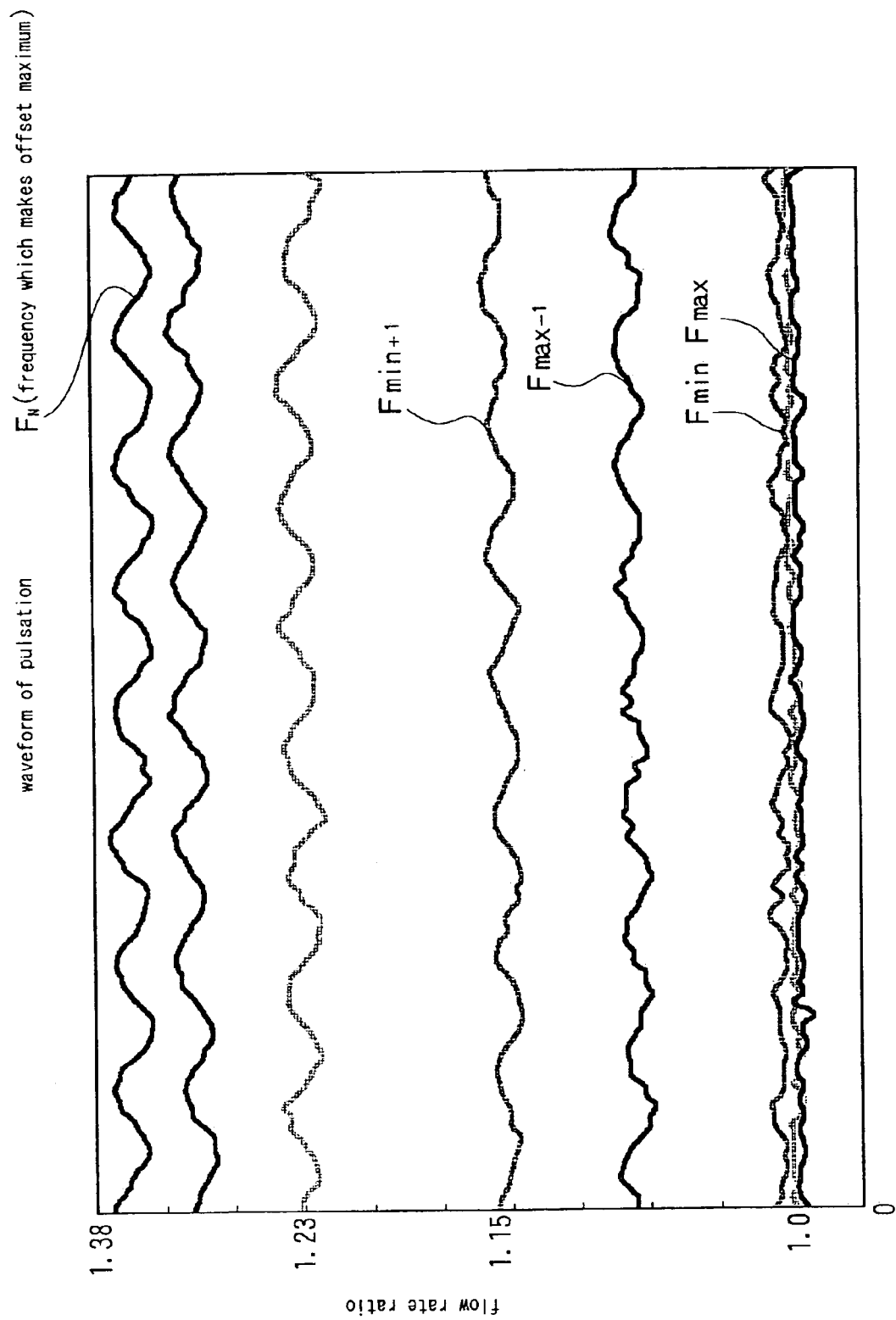
FIG. 9 is a diagram showing emission flow rate signal with pulsation.

By multiplying the obtained flow rate O by the concentration of each component such as HC, CO, $H_2O$ in the emission Ex measured by NDIR type gas analyzer or the like not shown, the emission amount of each component can be determined. Incidentally, the differential pressure signal Pd includes a measuring error depending on the pulsation frequency and amplitude as shown in FIG. 8 and FIG. 9 due to effects of pressure difference caused by pulsation of emission Ex.

In the invention, accordingly, by the arithmetic processing program 22 executed by the CPU 20, it is designed to cancel the error occurring in the differential pressure signal Pd due to effects of pulsation, depending on the amplitude of each frequency component of pulsation occurring in the flow of emission Ex in the arithmetic processing unit 9, thereby obtaining an accurate flow rate Q of the emission G.

More specifically, the storage unit 21 records plural correction coefficients A (Fmin, Ifmin) to A (Fmax, Ifmax) determined according to characteristics of the Pitot tube 13 preliminarily as table data 23, and when the CPU 20 executes the operation instructed by the arithmetic processing program 22, effects of pulsation can be adequately removed by using the correction coefficients A (Fmin, Ifmin) to A (Fmax, Ifmax).

Figure 3:
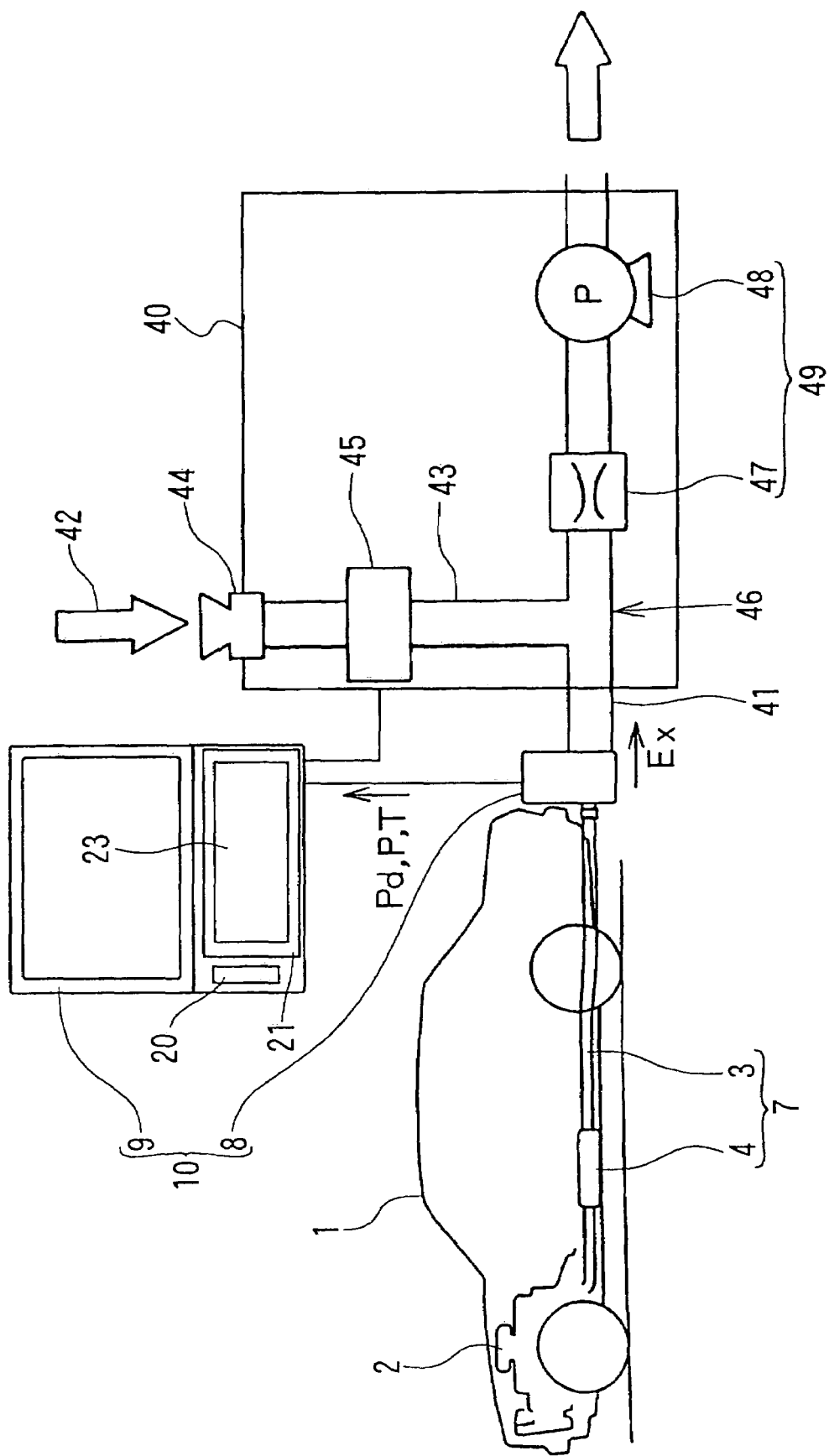
FIG. 3 is an explanatory diagram of method of determining correction coefficient used in the differential pressure type flow rate detecting apparatus.

FIG. 3 is a diagram showing a method of determining the correction coefficients A (Fmin, Ifmin) to A (Fmax, Ifmax). In FIG. 3, reference numeral 40 is a flow rate measuring apparatus of emission Ex using a CVS device, and a diluting air feed pipe 43 for feeding diluting air 42 is connected to a piping 41 connected at the downstream side of the adapter pipe 11, and from its upstream side, SAO (smooth approach orifice) 44 and air filter 45 are connected, and a CVS device 49 having CFV (critical flow Venturi) 47 and blower 48 is provided at the downstream side from connection point 46 of the diluting air feed pipe 43 of the piping 41. That is, by using the flow rate measuring apparatus 40, the diluting air volume is measured, and by determining the flow rate of emission Ex on the basis of the difference from the total flow rate of the CFV 47, the flow rate of emission Ex determined by a different principle of measurement from the Pitot tube type can be obtained.

Or, by analyzing the concentration of trace gas (for example, $CO_2$) the upstream side and downstream side of the connection point 46, the flow rate of the emission Ex can be calculated from the ratio of concentration of $CO_2$ before dilution and concentration of $CO_2$ after dilution, and the total flow rate of CFV 47.

In the structure shown in FIG. 3, the engine 2 is a pulsation generation device which generates pressure fluctuations at sequentially different pulsation frequencies in the flow of emission Ex, and by changing the rotating speed and load of the engine 2 sequentially, pulsation at different frequency and different amplitude can be generated. The flow rate of emission Ex including pulsation is measured by the Pitot tube 13, and the flow rate Qpit measured by the Pitot tube 13 at this time is compared with the flow rate Qsao+cfv or $Q_{co_2}$+cfv measured by different principle (SAO flowmeter+CFV, or $CO_2$ trace method+CFV).

That is, the flow rate Qsao+cfv or $Q_{co_2}$+cfv measured by using the flow rate measuring apparatus 40 of the embodiment is slow in response speed as compared with the flow rate Qpit determined by using the differential pressure signal Pd detected by the Pitot tube 13, and the pulsation cannot be measured in-situ, but, to the contrary, it is less susceptible to effects of pulsating pressure fluctuations, and it may be regarded as the flow rate Qcfv of actually flowing emission Ex (hereinafter the flow rate Qsao+cfv and/or $Q_{co_2}$+cfv may be expressed as the flow rate Qcfv of actually flowing emission Ex). More specifically, by comparing the flow rate Qpit obtained from the differential pressure gauge 8 with the flow rate Qcfv, the magnitude of measuring error due to pulsation appearing in the flow rate Qpit measured by using the differential pressure gauge 8 can be determined.

Figure 4:
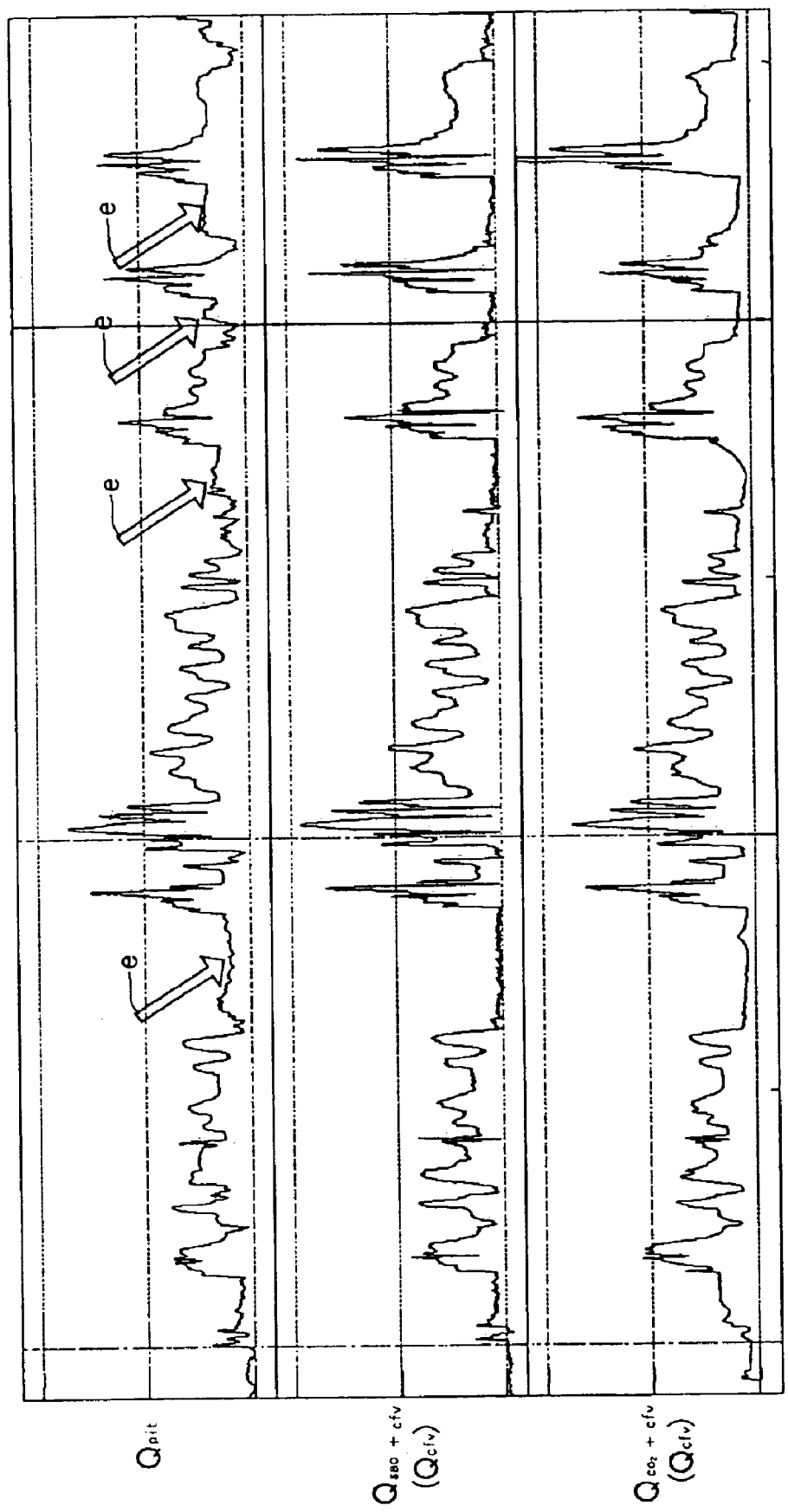
FIG. 4 is a diagram showing measured results of flow rate detected by each principle of measurement.

FIG. 4 compares the flow rates Qpit, Qsao+cfv, $Q_{co_2}$+cfv measured by using the apparatus in FIG. 3. As shown in FIG. 4, in the portion indicated by arrow e, the flow rate Qpit detected by the differential pressure gauge 8 is found to be pulled up (offset) as compared with the actual flow rate emission Ex (for example, Qcfv: measured value by using conventional critical flow Venturi (CFV) method). Hence, by determining the ratio Qpit/Qcfv these flow rates Qpit, Qcfv preliminarily as correction coefficient A, and adjusting the offset position of the flow rate Qpit obtained by the differential pressure gauge 8, it is known that the flow rate Qpit detected by the differential pressure gauge 8 can be corrected to an accurate flow rate Q.

The flow rate Qpit is, in the portion indicated by arrow e, largely deviated (offset) from the actual flow rate Qcfv. That is, as already explained in FIG. 8 and FIG. 9, the magnitude of deviation between the flow rates Qpit and Qcfv occurs depending on the frequency and amplitude of the pulsation.

Herein, for example, by Fourier transform of time waveform of ratio Qpit(t)/Qcfv(t) of flow rates Qpit(t), Qcfv(t) at time t, frequency components Fmin to Fmax and amplitudes Ifmin(t) to Ifmax(t) of pulsation determined, and correction coefficients A (Fmin, Ifmin(t)) to A (Fmax, Ifmax(t)) depending on these frequency components Fmin to Fmax and amplitudes Ifmin(t) to Ifmax(t) are obtained.

Between the flow rate Qpit(t) obtained by the output of the Pitot tube 13 and the true flow rate Qcfv(t), the relation as shown in formula (2) is considered to be established in terms of correction coefficient A(t) different at each time t.

$$Qcfv(t)=Qpit(t) \times A(t) \quad (2)$$

The correction coefficient A(t) may be regarded as a composite correction coefficient of correction coefficients A (Fmin, Ifmin(t)) (Fmax, Ifmax(t)) depending on the amplitudes Ifmin(t) to Ifmax(t) frequency components Fmin to Fmax. Assuming the minimum frequency component Fmin to be 2 Hz and the maximum frequency component Fmax to be 100 Hz, the frequency components Fmin to Fmax at time t are 2 to 100, and the amplitude I of frequency components 2 to 100 can be expressed as $I_2(t)$ to $I_{100}(t)$. The composite correction coefficient A(t) is expressed in formula (3).

$$A(t)=A(2, I_2(t)) \times A(3, I_3(t)) \times \ldots \times A(99, I_{99}(t)) \times A(100, I_{100}(t)) \quad (3)$$

Therefore, the arithmetic processing unit 9 compares the flow rate Qpit(t) obtained by the output of the Pitot tube and the flow rate Qcfv(t) actually flowing emission Ex in a state of sequentially changing the rotating speed and load of the engine 2 so as to cause pulsation different in amplitude Ifmin(t) to Ifmax(t) in every one of frequency components Fmin to Fmax, can calculates the correction coefficient A(t) at this time t inversely by using the relation of formula (2). At the same time, by determining the amplitudes Ifmin(t) to Ifmax(t) of frequency components Fmin to Fmax pulsation at each time t, and putting into formula (3), the correction coefficients A (Fmin, Ifmin) to A (Fmax, Ifmax) can be obtained.

The obtained correction coefficients A (Fmin, Ifmin) to A (Fmax, Ifmax) are recorded in the storage unit 21 as table data 23. That is, the table data 23 is two-dimensional data as shown in Table 1.

TABLE 1

| | | frequency component | | | | |
|---|---|---|---|---|---|---|
| | | Fmin | Fmin$_{+1}$ | ... | Fmax$_{-1}$ | Fmax |
| amplitude | 0.0 | 1 | 1 | ... | 1 | 1 |
| | 0.1 | 1.000 | 1.001 | ... | 1.001 | 1.000 |
| | ... | ... | ... | ... | ... | ... |
| | 0.9 | 1.004 | 1.009 | ... | 1.009 | 1.004 |
| | 1.0 | 1.005 | 1.010 | ... | 1.010 | 1.005 |
| | ... | ... | ... | ... | ... | ... |

In this embodiment, by Fourier transform of measured signal Qpit/Qcfv, frequency components Fmin to Fmax and amplitudes Ifmin to Ifmax of pulsation can be obtained. Using the amplitudes Ifmin to Ifmax, composite correction coefficient A(t) at each time t is determined from the correction coefficients A (Fmin, Ifmin) to A (Fmax, Ifmax) corresponding to the frequency components Fmin to Fmax.

In this example, the amplitudes Ifmin Ifmax of frequency components Fmin to Fmax of pulsation are determined from the flow rate ratio Qpit/Qcfv, but the amplitudes Ifmin Ifmax of frequency components Fmin to Fmax may be also determined from the differential pressure signal Pd detected by the Pitot tube 13. Further, the offset occurring between the flow rates Qpit and Qcfv is expressed as the flow rate ratio Qpit/Qcfv as mentioned above, but may be also expressed as the flow rate difference Qpit−Qcfv. In this case, the formula (3) is adjusted properly.

Anyway, the obtained correction coefficients A (Fmin, Ifmin) to A (Fmax, Ifmax) are recorded in the storage unit 21, and the user can select proper correction coefficients A (Fmin, Ifmin) to A (Fmax, Ifmax) according to the Pitot tube 13 to be used, so that the flow rate can be detected more accurately even if pulsation occurs.

Since the correction coefficients A (Fmin, Ifmin) to A (Fmax, Ifmax) are values suited to the characteristics of the Pitot tube 13, it is enough to measure once when manufacturing the Pitot tube 13, and the correction coefficients A (Fmin, Ifmin) to A (Fmax, Ifmax) can be determined by using the flow rate measuring apparatus 40 by the manufacturer of the differential pressure type flow rate detecting apparatus 10. Therefore, the user, once recording the correction coefficients A (Fmin, Ifmin) to A (Fmax, Ifmax) suited to the characteristics of the Pitot tube 13 in the storage unit 21, does not have to calculate the correction coefficients A (Fmin, Ifmin) to (Fmax, Ifmax) again by using the flow rate measuring apparatus 40. Further, the correction coefficients A (Fmin, Ifmin) to A (Fmax, Ifmax) additionally recorded by using a recording medium such as flexible disk, or may be downloaded from the manufacturer by data communications.

In the preferred embodiment, more accurate correction coefficients A (Fmin, Ifmin) to A (Fmax, Ifmax) are obtained by using the flow measuring apparatus 40 for measuring the flow rate by different principle of measurement, but instead of this flow rate measuring apparatus 40, a conventional buffer tank of variable capacity as disclosed in Japanese Laid-open Patent No. HI0-318810 may be disposed at the upstream side of the differential pressure gauge 8 shown in FIG. 1. That is, using the buffer tank of variable capacity, the flow rate determined in a state of free from pulsation in the differential pressure gauge 8 is obtained as correct flow rate, and by measuring the effect of pulsation on the flow rate Qpit, the correction coefficients A (Fmin, Ifmin) to A (Fmax, Ifmax) may be also obtained.

When the user measures the flow rate Q of emission Ex by using the differential pressure type flow rate detecting apparatus 10 shown in FIG. 1, the operation is as described specifically below.

Figure 5:
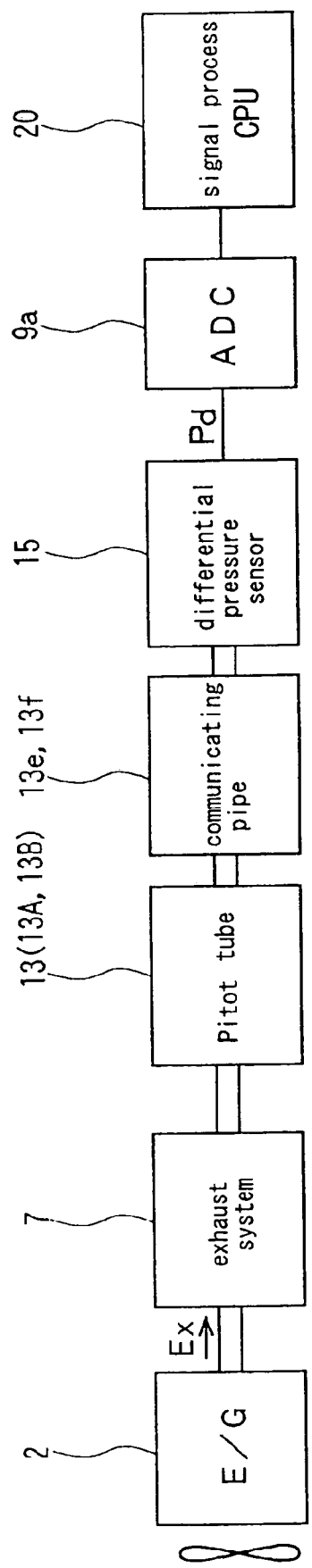
FIG. 5 is an explanatory diagram of operation of differential pressure type flow rate detecting apparatus of the invention.
Figure 6:
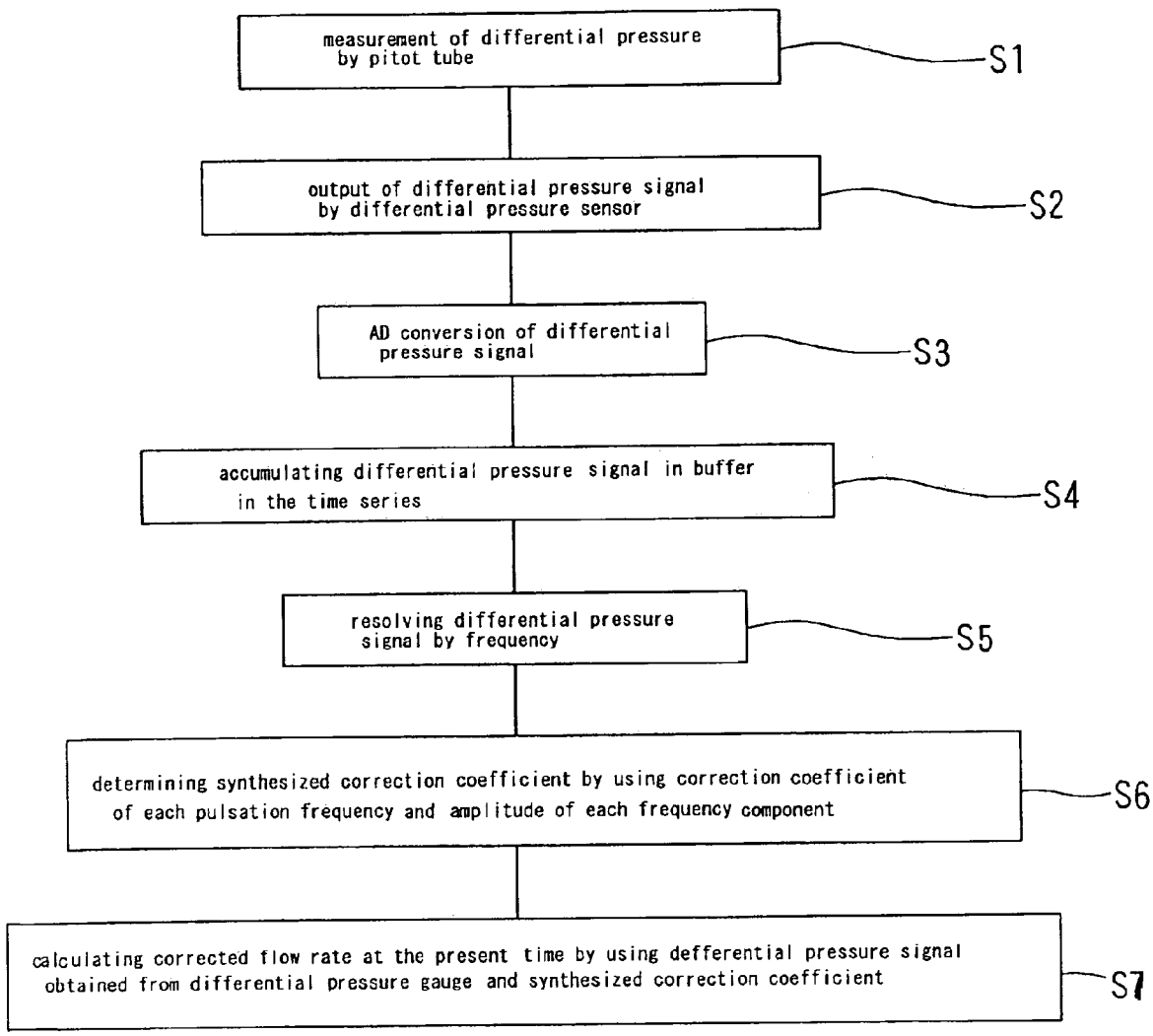
FIG. 6 is an explanatory diagram of operation of differential pressure type flow rate detecting apparatus of the invention.
Figure 7:
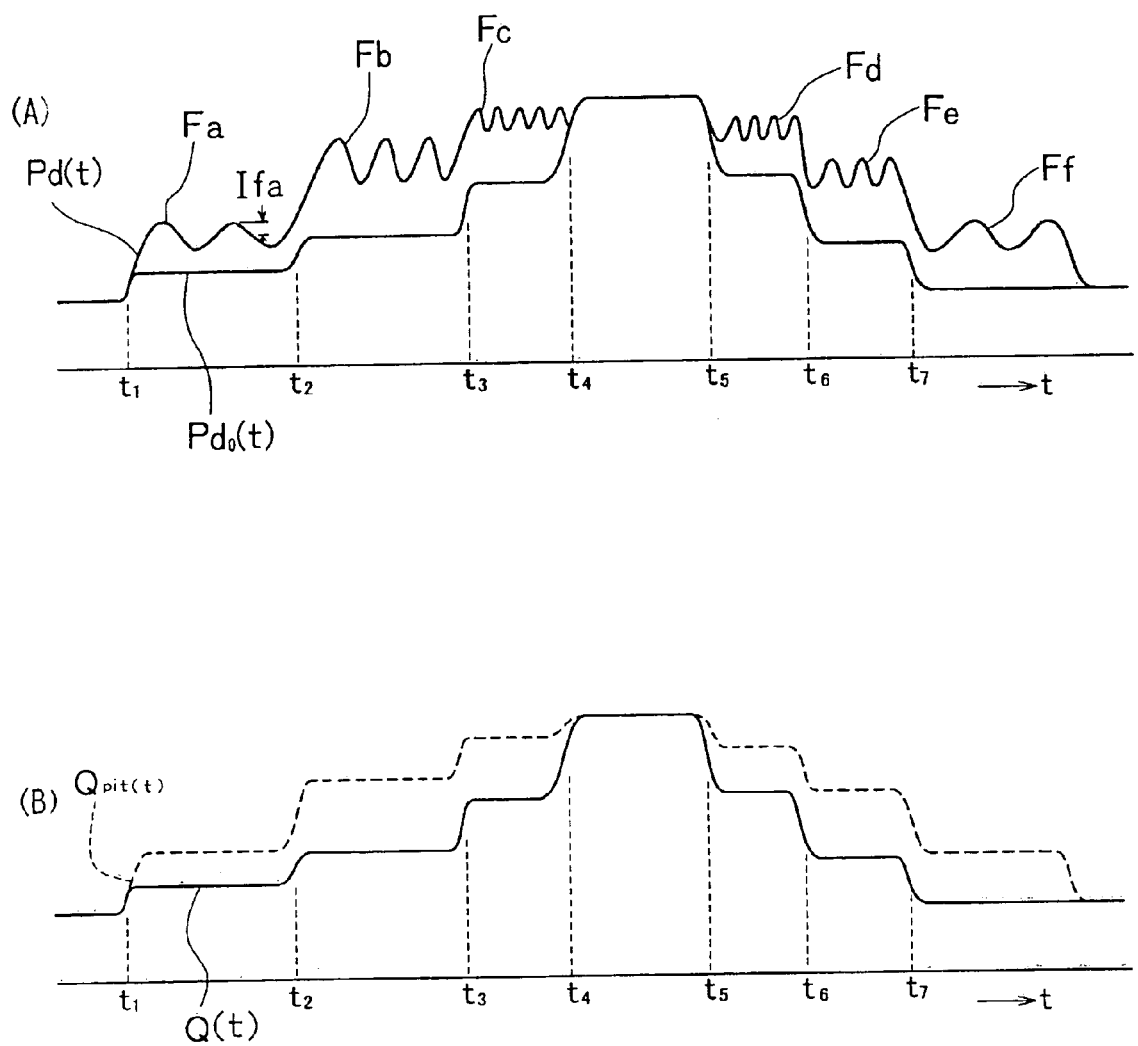
FIG. 7 is an explanatory diagram of operation of differential pressure type flow rate detecting apparatus of the invention.

FIG. 5 is a block diagram showing flow of emission and flow of signal processing for measuring its flow rate, FIG. 6 is a diagram explaining flow of a series of actions by the differential pressure type flow rate detecting apparatus 10, and FIG. 7 is a diagram explaining the concept of signal processing In FIG. 5 to FIG. 7, same reference numerals as in FIG. 1 to FIG. 6 indicate same or similar parts, and their detailed description is omitted.

As shown in FIG. 5, the emission Ex exhausted from the engine 2 passes through the exhaust system 7 and flows into the Pitot tube 13. The pressure in the Pitot tube 13 is measured by the differential pressure sensor 15 coupled by communicating pipes 13e, 13f. Reference numeral 9a is an AD converter in the arithmetic processing unit 9, and the signal converted into digital signal in every sampling time τ this AD converter 9a is fed into the CPU 20, and the series of actions is executed as explained below.

That is, in FIG. 5, the portions indicated by reference numerals 2, 7, 13, 13e, 13f, 15 show a physical flow of emission Ex, and the portions indicated by reference numerals 15, 9a, 20 show an electric signal flow. Similarly, the operation shown in FIG. 6 includes, in addition to the operation of hardware of differential pressure gauge 8 and others, the operation of the CPU 20 following the procedure of the arithmetic processing program 22 (software), showing the process from detection of differential pressure Pd to calculation of emission flow rate Q.

In FIG. 6, SI shows measurement of differential pressure by Pitot tube 13. That is, along with the flow F of emission Ex, a differential pressure is detected between the Pitot tube for detection of static pressure 13A and the Pitot tube for detection of dynamic pressure 13B.

Further, S2 shows the output of differential pressure signal Pd by the differential pressure sensor 15. That is, the differential pressure sensor 15 connected to the Pitot tubes 13 & 13B converts this differential pressure and outputs as a differential pressure signal Pd of analog electric signal. Herein, the detected differential pressure signal Pd includes several frequency components Fa, Fb . . . as shown in FIG. 7(A).

In FIG. 6, S3 shows AD conversion of the differential pressure signal Pd. That is, by digital conversion of analog differential pressure signal Pd, the arithmetic processing unit 9 takes in and processes the measured signal Pd of differential pressure. In this preferred embodiment, the AD converter 9a is provided in the input unit of the arithmetic processing unit 9, but the AD converter may be also provided in the output unit of the differential pressure gauge 8.

Step S4 shows the process of accumulating the differential pressure signal Pd in the buffer of the storage unit 21 in time series at interval of v. By accumulating in the buffer by the software, the structure of the hardware may be simplified, but by processing by the hardware by using an exclusive circuit or the like, the load on the arithmetic processing unit 20 may be decreased.

The capacity of the buffer is enough as far as steps S5 to S8 can be executed by storing the differential pressure signal Pd for the duration of T seconds, but in this preferred embodiment the capacity of the buffer is large enough to store for the duration T of about 500 milliseconds. Herein, since the minimum frequency of pulsation for frequency resolution is 2 Hz, a buffer of 500 milliseconds is needed for detecting the minimum frequency component. On the other hand, to detect the maximum frequency component (for example, 100 Hz), the sampling time z of the AD converter 9a is preferred to be about 5 milliseconds.

Step S5 shows the process of resolving the differential pressure signal Pd(t) by frequency. That is, using the differential pressure signal Pd(t) accumulated in the buffer, by resolving each frequency component waveform included in the differential pressure signal Pd(t) at the present time t, the frequency components Fmin to Fmax and amplitudes Ifmin(t) Ifmax(t) included in the waveform can be obtained.

As the method of frequency resolution, a method of using fast Fourier transform may be considered, but this process is not limited to the process by the software, and it may be executed by hardware like exclusive circuit. For frequency resolution, using spectrum analyzer or the like, amplitudes Ifmin(t) to Ifmax(t) of frequency components Fmin to Fmax may be determined.

In the example shown in FIG. 7(A), pulsation is not caused from start of measurement to time t1, and the amplitudes Ifmin(t) to Ifmax(t) frequency components Fmin to Fmax are all O, but from time t1 to t2, an amplitude Ifa is detected in a Certain frequency component Fa, from time t2 to t3, an amplitude Ifb is detected in other frequency component Fb, and from time t3 to t4, an amplitude Ifc is detected in other different frequency component Fc. Meanwhile, $Pd_0(t)$ shows a differential pressure signal free from effect of pulsation.

In FIG. 6, S6 shows the process of determining a synthesized correction coefficient A(t) from the relation of the correction coefficients A (Fmin, Ifmin) to A (Fmax, Ifmax) and amplitudes Ifmin(t) to Ifmax(t) frequency components Fmin to Fmax. That is, in this process S6, the arithmetic processing unit 20 adjusts by using the correction coefficients A (Fmin, Ifmin) to A (Fmax, Ifmax) recorded in the storage unit 21 as the table data 23, and the amplitudes Ifmin(t) to Ifmax(t) of frequency components to Fmax occurring in the differential pressure signal Pd at the present time t determined at step S5, and determines the synthesized correction coefficient A(t) at the present time t.

Explaining more specifically by referring to the example shown in FIG. 7(A) and FIG. 7(B), up to time t1, all amplitudes Ifmin(t) to Ifmax(t) are o, and hence the composite correction coefficient A(t)=1. On the other hand, from time t1 to t2, amplitude Ifa is detected in a certain frequency component Fa, and the composite correction coefficient A(t) becomes A (Fa, Ifa(t)) using the amplitude Ifa(t) in this frequency component Fa.

From time t2 to t3, since amplitude Ifb(t) is detected in frequency component Fb, the composite correction coefficient A(t) is determined shown in formula (4) by putting the value Ifb(t) in formula (3). In (A), for the sake of simplicity of explanation, the differential pressure signal Pd has only one frequency component (Fa, or the like), but frequency resolution, it may be considered to detect amplitudes Ifmin (t) Ifmax(t) in plural frequency components Fa, Fb, and in such a case, the following formula is a polynomial formula of the number of detected frequency components Fa, Fb $$A(t) = 1 \times \cdots \times A(Fb, 1fb(t)) \times \cdots \times 1 \quad (4)$$
$$= A(fb, 1fb(t))$$

Hereinafter, similarly, the composite correction coefficient A(t) at each time t is determined by using the amplitudes Ifmin(t) to Ifmax(t) frequency components Fmin to Fmax at this time t.

In FIG. 6, S7 shows the process of calculating the corrected flow rate Q at the present time t by using the differential pressure signal Pd(t) obtained from the differential pressure gauge 8 and the synthesized correction coefficient A(t). That is, by correcting the flow rate Qpit(t) determined by using the differential pressure signal Pd(t) obtained from the differential pressure gauge 8 by using the formula (1), by using the synthesize correction coefficient A(t) determined at step S6 as shown formula (5) below, a precise and accurate flow rate Q(t) canceling effects pulsation is determined, and it can be output. (FIG. 7(B) shows an example of flow rates Qpit(t), Q(t) obtained by averaging process.)

$$Q(t) = Qpit(t)/A(t) \quad (5)$$

Calculation of obtaining the accurate flow rate Q(t) is not limited to correction by using the correction coefficient h(t) after once calculating the flow rate Qpit(t) as shown in formula (5). That is, after determining the differential pressure signal Pd'(t) correcting the effect of pulsation, an accurate flow rate Q(t) may be determined by using this differential pressure signal Pd'(t) according to formula (I).

Steps S1 to S7 in FIG. 6 are repeated consecutively as far as the measurement continues.

As described herein, the flow rate Qout(t) determined by using the differential pressure type flow rate detecting apparatus 10 of the embodiment accurately represents the specific portion of the generated pulsation, and since the measuring error caused by pulsation is corrected, the flow rate can be measured accurately.

Figure 10:
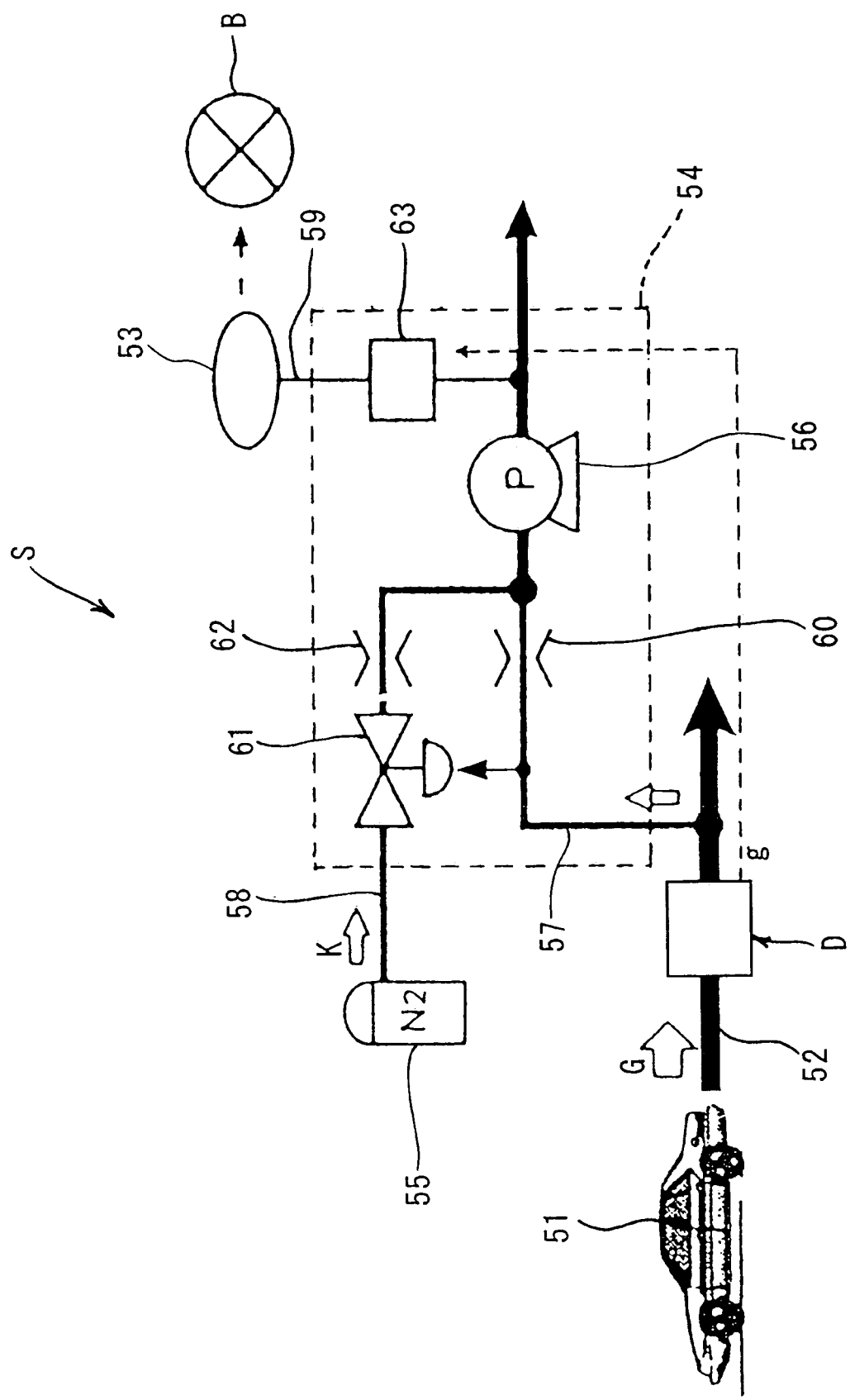
FIG. 10 is a schematic explanatory diagram of configuration of emission measuring system in a preferred embodiment of the invention.
Figure 11:
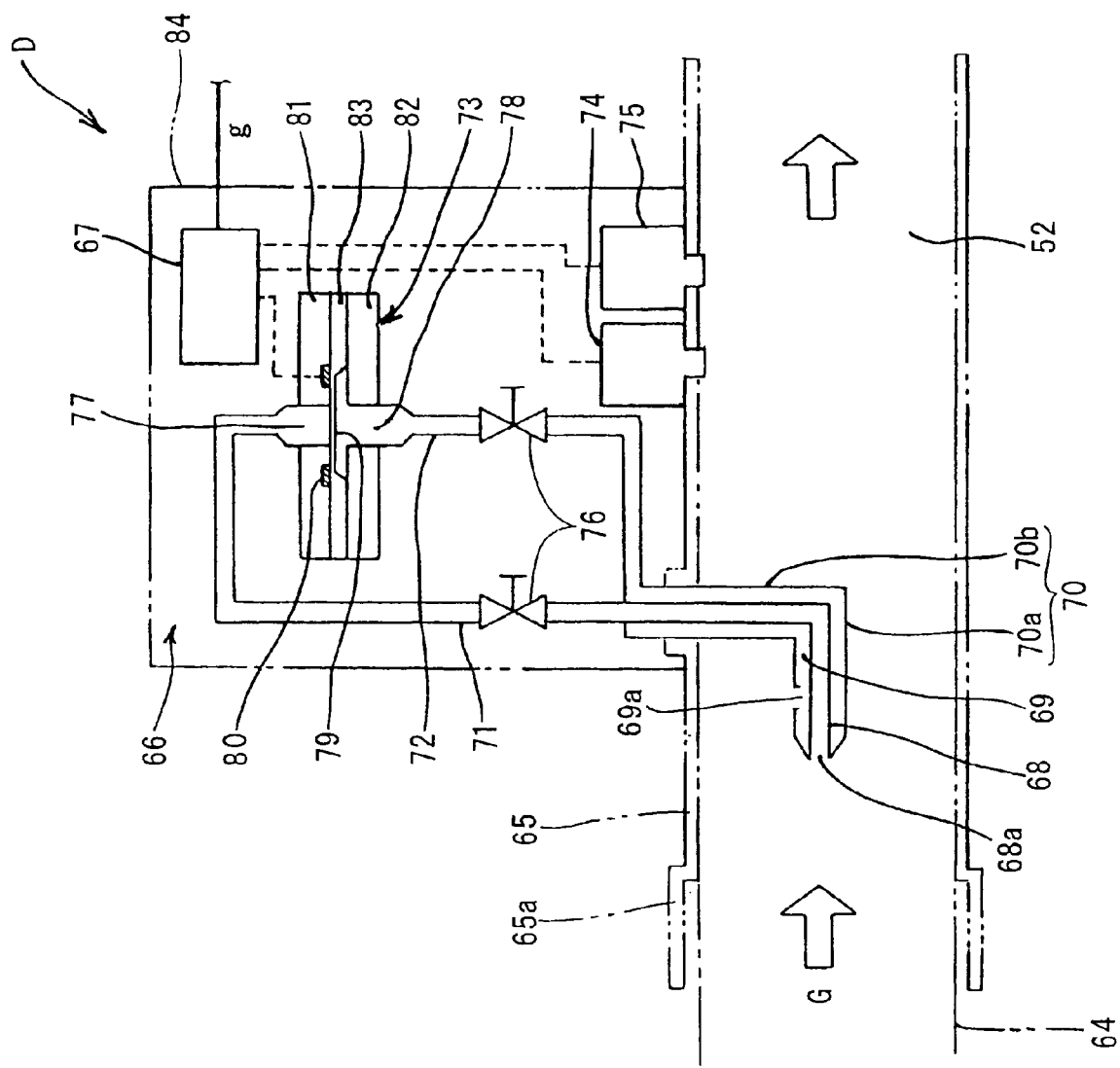
FIG. 11 is a schematic explanatory diagram of configuration of emission flow rate measuring apparatus in the preferred embodiment.

FIG. 10 and FIG. 11 show a preferred embodiment of the invention.

As shown in FIG. 10, the emission measuring system S of the embodiment comprises an emission flow rate measuring apparatus D (detail described below) for measuring the flow rate of the emission G provided in a passage 52 of emission G exhausted from an engine (not shown) of an automobile 51, sample bag 53, a mini diluter 54 for diluting part of the emission G flowing in the passage 52 and collecting in the sample bag 53 at a flow rate proportional to the flow rate of the emission G measured by the emission flow rate measuring apparatus D, a diluting gas feed supply source 55 for supplying a diluting gas ($N_2$ in this embodiment) K for diluting the emission into the mini diluter 54, and a gas analyzer B connected to the sample bag 53 for analyzing specific components (for example, HC, CO, $H_2O$, $NO_x$) in the emission G collected in the sample bag 53.

The diluting gas supply source 55 is, for example, a high pressure cylinder containing diluting gas. The gas analyzer B is, for example, a nondispersion infrared spectroscopic (NDIR) gas analyzer.

The mini diluter 54 is described below.

The mini diluter 54 comprises a sample gas passage 57 connected to the passage 52 at the upstream end and having an intermediate pump 56, a diluting gas passage 58 connected to the diluting gas supply source 55 at the upstream end, and connected to the sample gas passage 57 at the downstream end, and a sample gas collecting line 59 of which upstream end is connected to a position at the downstream side from the connection point of the diluting gas passage 58 in the sample gas passage 57, and downstream end is connected to the sample bag 53.

The sample gas passage 57 has a sampling probe (not shown) inserted in the passage 52 and for collecting part of emission G flowing in the passage 52 at the upstream end. A critical flow Venturi (CFV) 60 is disposed at position of upstream side of the connection point of the diluting gas passage 58 in the sample gas passage 57.

As the detail is described below, the passage 52 of the embodiment is composed of an exhaust pipe and a tail pipe attachment 65 as shown in FIG. 11, and the sampling probe of the sample gas passage 57 is inserted in the tail pipe attachment 65, but it is omitted in FIG. 11.

The diluting gas passage 58 includes a regulator 61 and a critical flow Venturi (CFV) 62 sequentially from the upstream side. The regulator adjusts the ratio of the flow rate of emission G flowing in the sample gas passage 57 and the flow rate of the diluting gas K flowing in the diluting gas passage 58 to be always constant, and by the diluting gas K flowing into the sample gas passage 57 from the diluting gas passage 58, the emission G flowing in the sample gas passage 57 is diluted at a constant ratio. As the detail is described below, the passage 52 of the embodiment is composed of an exhaust pipe 64 and a tail pipe attachment 65 as shown in FIG. 11, and the sampling probe of the sample gas passage 57 is inserted in the tail pipe attachment 65, but it is omitted in FIG. 11.

The sample gas collecting line 59 is for collecting part of the emission G diluted at a constant ratio by the diluting gas K in the sample gas passage 57 in the sample bag 53. This sample gas collecting line 59 includes a mass flow controller (MFC) 63, and in the MFC 63, the measured value of the flow rate of the emission G flowing in the passage 52 is fed back as output signal g from the emission flow rate measuring apparatus D. The collection flow rate into the sample bag 53 of the emission G diluted at a constant ratio by the diluting gas K is controlled so as to be proportional to the measured value of the flow rate of the emission G flowing in the passage 52 by MFC 63.

The emission flow rate measuring apparatus D is described below.

As shown in FIG. 11, the emission flow rate measuring apparatus D is composed as a car-mount type, and more specifically comprises a tail pipe attachment 65 detachably connected to the downstream end of an exhaust pipe 64 of an automobile 51 for composing the passage 52, a differential pressure type flowmeter 66 for measuring the flow rate of emission G flowing in this tailpipe attachment 65, and an arithmetic processing unit (for example, personal computer) 67 for receiving an output signal from this differential pressure type flowmeter 66, and the differential pressure type flowmeter 66 and arithmetic processing device 67 are assembled as a unit and mounted on the tail pipe attachment 65.

The tail pipe attachment 65 is a nearly tubular (cylindrical) member having an inside diameter same as that of the exhaust pipe 64, and its one end has a connection part 65a detachably and externally fitted to the downstream side of the exhaust pipe 64, and other end is open.

The differential pressure type flowmeter 66 is a Pitot tube type flowmeter for detecting the differential pressure of the total pressure (static pressure+dynamic pressure) and the static pressure of the tail pipe attachment 65 where the emission G flows by a Pitot tube 70 (described specifically later). More specifically, the differential pressure type flowmeter 66 comprises a Pitot tube 70 having a total pressure detector 68 and a static pressure detector 69 provided respectively in the tail pipe attachment 65, a differential pressure sensor 73 to which the total pressure detector 68 is connected by way of a first communicating part 71 and the static pressure detector 69 is connected by way of a second communicating part 72, and a temperature sensor 74 and a pressure sensor 75 provided in the tail pipe attachment 66 for measuring the temperature and pressure of the emission G flowing in the tail pipe attachment 65.

The Pitot tube 70 has a double tube structure having a Pitot tube for detection of static pressure disposed as static pressure detector 69 at the outside of a Pitot tube for detection of total pressure as the total pressure detector 68. The Pitot tube 70 is bent nearly in an L-shape, and has a parallel portion 70a disposed nearly parallel in the axial direction in the tail pipe attachment 65, and a vertical portion 70b disposed so as to penetrate the side wall of the tail pipe attachment 65, sequentially from the leading end side.

The parallel portion 70a of the Pitot tube for detection of total pressure 68 is disposed oppositely to the upstream side (left side in FIG. 11) of the emission G flowing in the tail pipe attachment 65, and an opening 68a is formed at the leading end.

In the side wall of the parallel portion 70a of the Pitot tube for detection of static pressure 69, a through-hole 69a is formed so as to be vertical to the flowing direction of the emission G in the tail pipe attachment 65. It is closed between the leading end of the parallel portion 70a of the Pitot tube for detection of static pressure 69 and the leading end of the parallel portion 70a of the Pitot tube for detection of total pressure 68.

The first communicating part 71 and second communicating part 72 are composed of a piping having a length of 10 m or less, and an inside diameter of 2.0 to 50 mm.

Further, the first communicating part 71 and second communicating part 72 are provided with throttling valves (needle valves) response difference adjusting mechanism 76 for eliminating response difference between total pressure and static pressure in the differential pressure sensor 73.

The differential pressure sensor 73 is, for example, a semiconductor differential pressure sensor, and the differential pressure sensor 73 of the preferred embodiment is a fast response type differential pressure sensor designed to detect the differential pressure of the static pressure and total pressure at the response frequency of higher (preferably 4 to 5 times or more) than the pulsation frequency (for example, about 20 Hz or more) of emission G in idling state of engine of the automobile 51, and output the differential pressure signal to the arithmetic processing device 67.

More specifically, the differential pressure sensor 73 comprises a total pressure lead-in part 77 communicating with the total pressure detector 68 by way of the first communicating part 71, a static pressure lead-in part 78 communicating with the static pressure detector 69 by way of the second communicating part 72, a diaphragm 79 disposed between the total pressure lead-in part 77 and static pressure lead-in part 78, and a distortion detection sensor 80 disposed near this diaphragm 79.

The total pressure lead-in part 77 is provided in its thickness direction to penetrate through a silicon substrate 81, and the static pressure lead-in part 78 is provided in its thickness direction to penetrate through a silicon substrate 82. The diaphragm 79 is a thin film of about 50 μm in thickness formed by etching formed on a silicon layer 83 enclosed between the two silicon substrates 81, 82. That is, the differential pressure sensor 73 of the preferred embodiment is a diffusion type distortion gauge differential pressure gauge having a high response frequency by reducing the size of the diaphragm 79 by etching cavity. The diameter of the diaphragm 79 is set properly.

In the differential pressure sensor 73 having such structure, the diaphragm 79 is distorted depending on the pressure difference (differential pressure) of the total pressure detected by the total pressure detector 68 and the static pressure detected by the static pressure detector 69, and this distortion amount is electrically detected by the distortion detection sensor 80, and the differential pressure signal showing the pressure difference is sent from the distortion detection sensor 80 to the arithmetic processing device 67.

The temperature sensor 74 and pressure sensor 75 transmit the measured values of temperature and pressure of emission G flowing in the passage 2 to the arithmetic processing device 67 as temperature signal and pressure signal, respectively.

The arithmetic processing device 67 is, together with the differential pressure type flowmeter 66, accommodated in a case 84, and detachably attached to the tail pipe attachment 65, and receives output signals from the differential pressure sensor 73, temperature sensor 74, and pressure sensor 75, operates these signals in formula (6) and calculates the measured value of flow rate of emission, and sends this measured value as output signal g to the MFC 63 of the mini diluter 54.

The measured value of emission flow rate determined in the arithmetic processing device 67 is sent to the gas analyzer B, and the gas analyzer B multiplies them by the measured concentration of components such as HC, CO, $H_2O$, $NO_x$ in the emission G, and the emission amount of each component is calculated.

In the emission flow rate measuring apparatus D having such structure, if the emission G flowing in the passage 52 pulsates and dynamically changes momentarily, the differential pressure of the emission G can be measured accurately, and the measured value of the emission flow rate is obtained correctly.

That is, major causes of measuring error of emission flow rate occurring due to pulsation of emission G are the use of the averaged measured value of differential pressure instead of correct measured value of differential pressure in calculation of flow rate (amplitude error) because of low response frequency of differential pressure sensor 73 and the difference in response time between total pressure and static pressure detected by the differential pressure sensor 73 (phase error).

In the emission flow rate measuring apparatus D of the preferred embodiment, since it is designed to detect the differential pressure of static pressure and total pressure at a response frequency higher than the pulsation frequency of emission G, averaging of detected differential pressure is suppressed, and hence the amplitude error can be reduced substantially or even eliminated. For example, by the sampling theorem, the original waveform of differential pressure can be reproduced if the response frequency of the differential pressure sensor 73 is 2 times or more the pulsation frequency.

Figure 12:
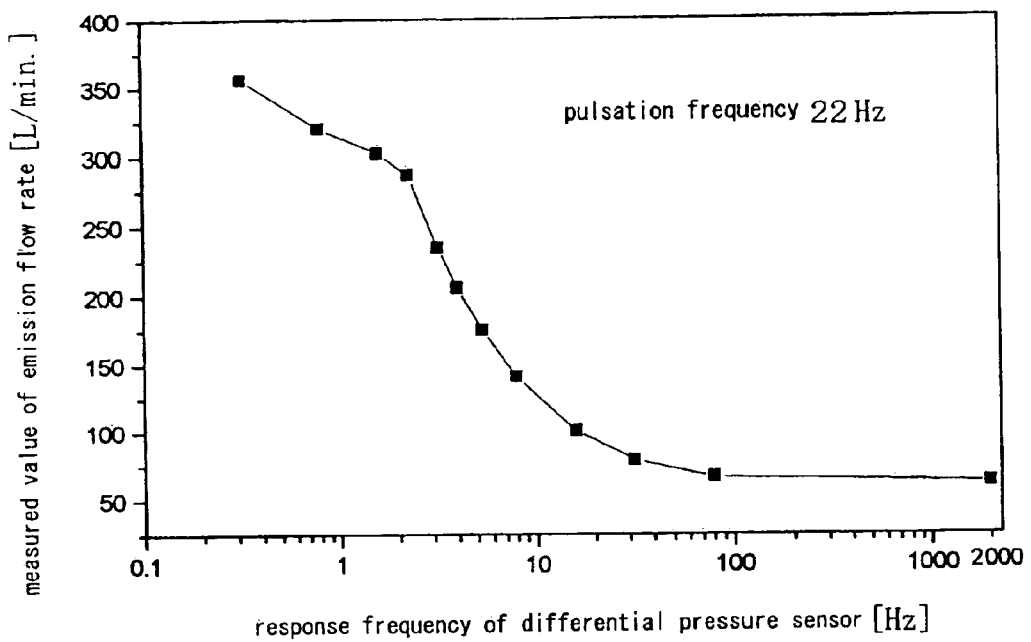
FIG. 12 is a graph schematically showing the relation of response frequency of differential pressure sensor and measured value of emission flow rate obtained by simulation.

To confirm this, it was simulated by using a computer. In this simulation, using a differential pressure sensor 73 of response frequency of 2000 Hz, the emission G with pulsation frequency of 22 Hz was measured, and the obtained emission flow rate was used as the reference, and the response frequency of the differential pressure sensor 73 was gradually lowered, and the obtained measured values of emission flow rate were studied. The result is graphically shown in FIG. 12. In FIG. 12, the axis of abscissas denotes the response frequency [Hz] of the differential pressure sensor 73, and the axis of ordinates represents the measured value [L/min] of emission flow rate.

As clear from FIG. 12, when the response frequency of the differential pressure sensor 73 is much lower than the pulsation frequency, the measured value of the emission flow rate tends to be greater, and when the response frequency of the differential pressure sensor 73 is nearly equal to the pulsation frequency, the error is small, or when the response frequency of the differential pressure sensor 73 is more than 4 or 5 times higher than the pulsation frequency, the error is almost nil.

Therefore, in the emission flow rate measuring apparatus D, by designing the arithmetic processing device 67 to convert the momentary value of the differential pressure indicated by the differential pressure signal of the differential pressure sensor 73 into the flow rate of emission G, and to determine the average flow rate of emission G by averaging, the emission flow rate can be calculated very precisely.

In the emission flow rate measuring apparatus 3 of the embodiment, since the response difference adjusting mechanism 76 is provided between the total pressure detector 68 and differential pressure sensor 73, and between the static pressure detector 69 and the differential pressure sensor 73, such phase error can be decreased significantly or even eliminated.

Figure 13:
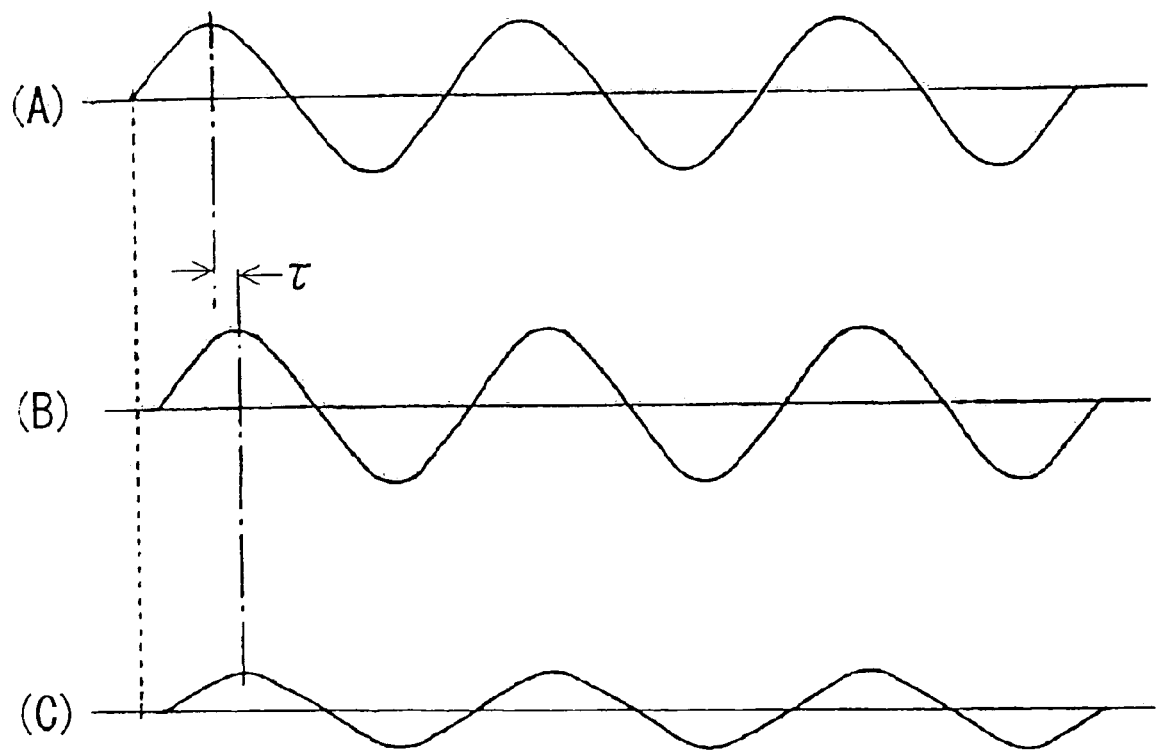
FIG. 13(A) is a graph schematically showing time-course changes total pressure detected by total pressure detector, (B) is a graph obtained by parallel shift of the graph in (A), and (C) is a graph schematically showing time-course changes of static pressure detected by static pressure detector.
Figure 14:
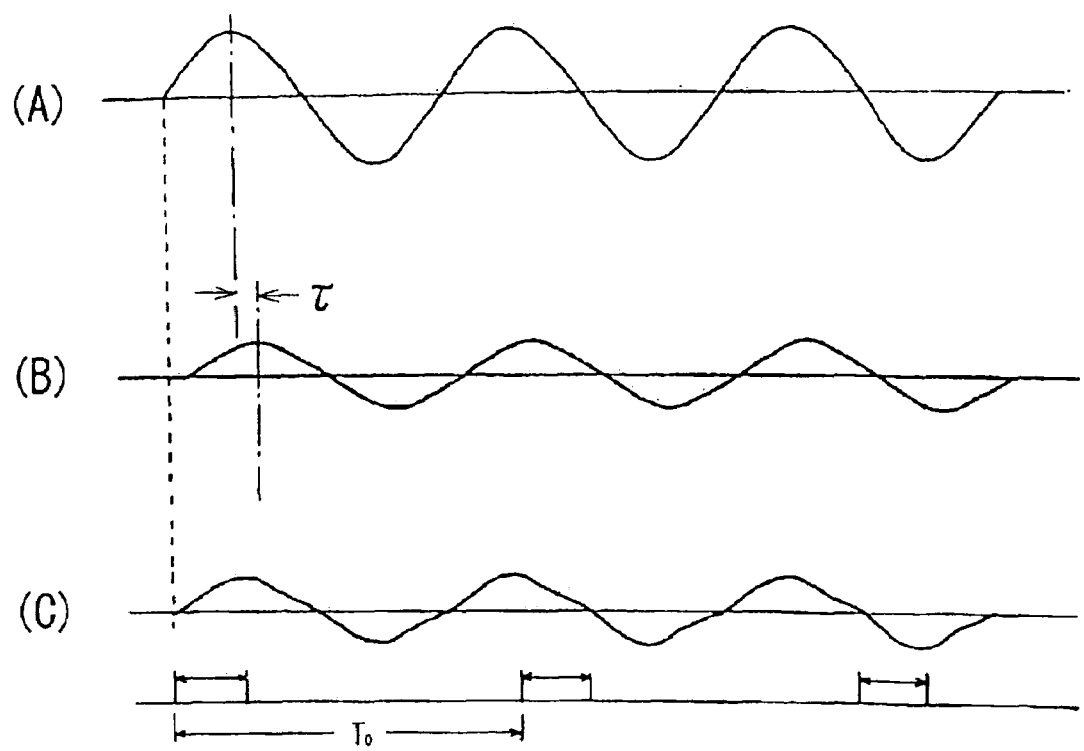
FIG. 14(A) is the same graph as in FIG. 13(A), (B) is the same as in FIG. 13(C), and (C) is a graph showing the difference of (A) and (B)

More specifically, as shown in FIG. 13, if there is a difference τ in response time between the total pressure (see FIG. 13(A)) detected by total pressure detector 68 and the static pressure (see FIG. 13(C)) detected by the static pressure detector 69, hitherto, without adjusting the difference τ in response time as shown in FIG. 14, the difference (see FIG. 14(C)) of the total pressure (see FIG. 14(A), same as FIG. 13(A)) static pressure (see FIG. 14(B), same as FIG. 13(C)) was taken differential pressure signal, which caused a phase error.

Figure 15:
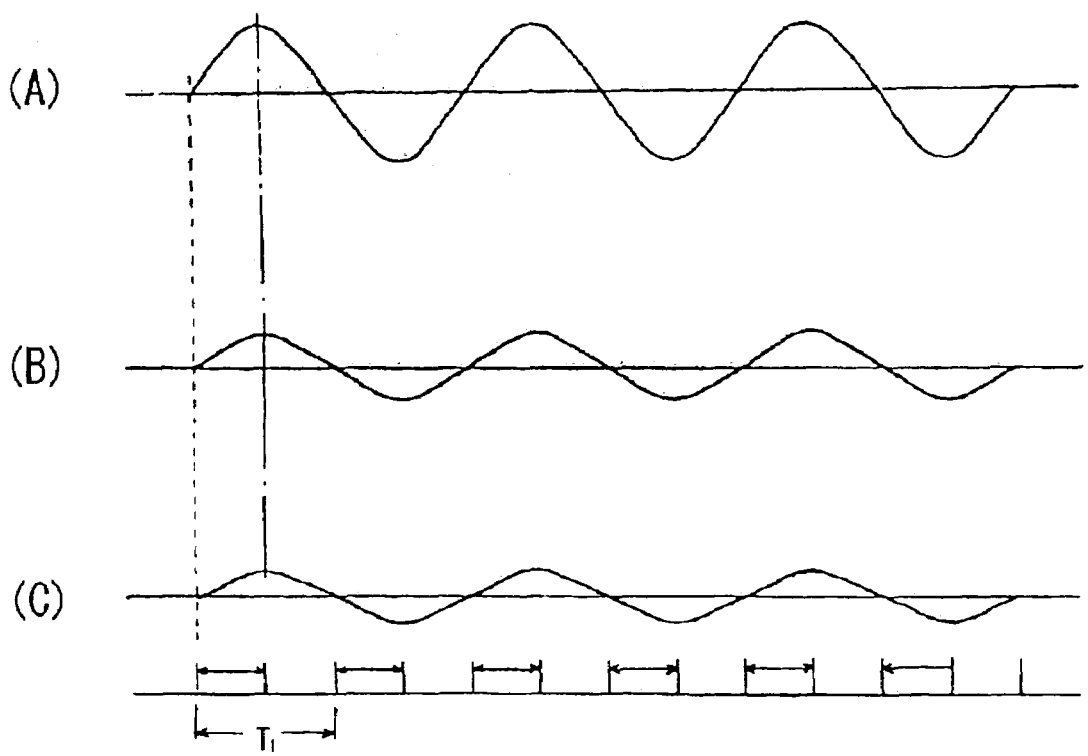
FIG. 15(A) is the same graph as in FIG. 13(B), (B) is the same as in FIGS 13(C), and (C) is a graph showing the difference of (A) and (B)
Figure 16:
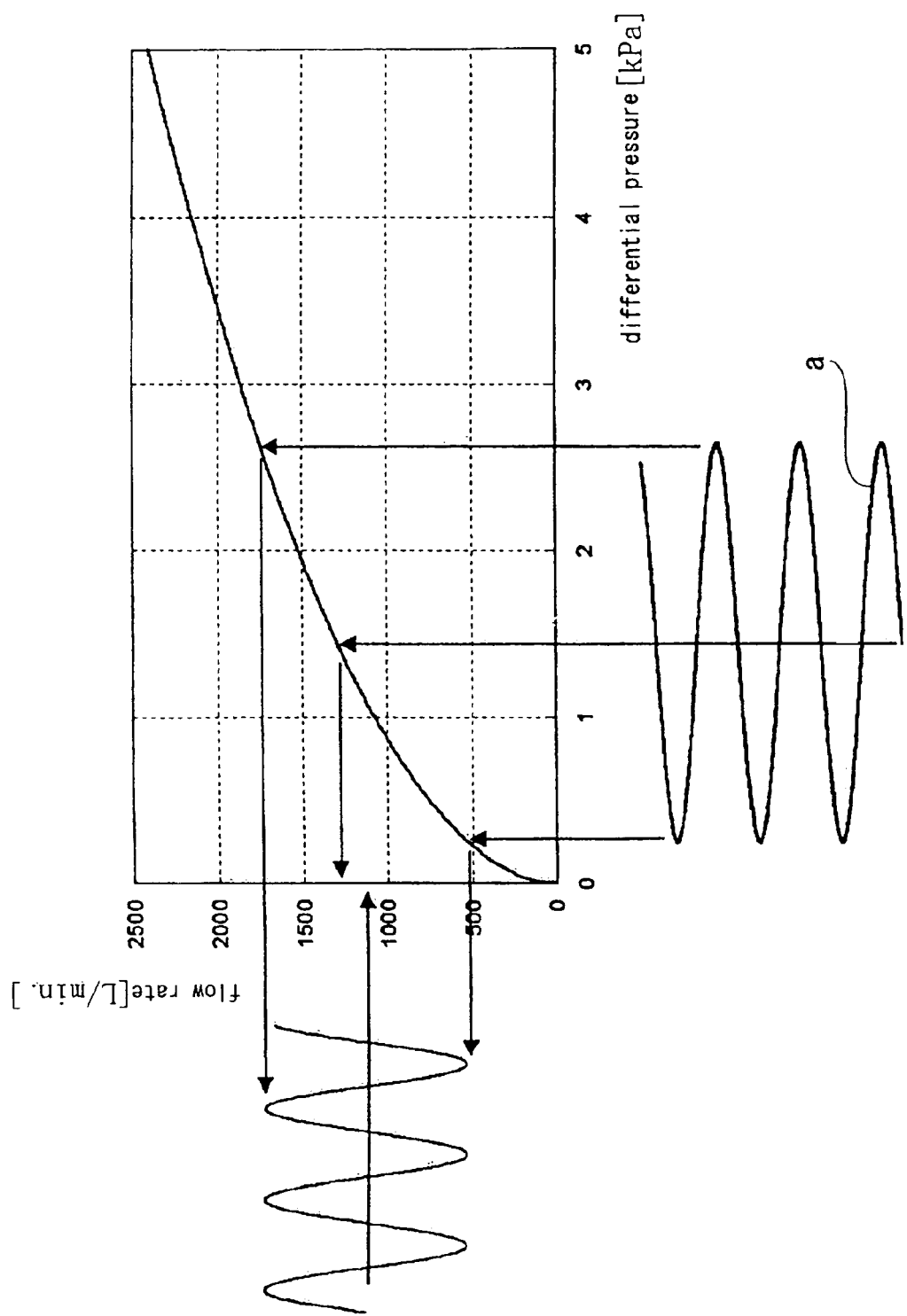
FIG. 16 is a graph schematically showing the relation of differential pressure and flow rate in Pitot tube flowmeter.

In the emission flow rate measuring apparatus D of the embodiment, the difference τ in response time is adjusted by the response difference adjusting mechanism 76, and as shown in FIG. 13(B), for example, the total pressure is adjusting by shifting parallel by τ in the time axis direction, and as shown in FIG. 15, the difference (see FIG. 15(C)) of the total pressure (see FIG. 15(A), same as FIG. 13(B)) and the static pressure FIG. 15(B), same as FIG. 13(C)) after adjustment is taken out differential pressure signal, so that the phase error can be eliminated.

Further, in the prior art, as shown in FIG. 14, since the operation period $T_0$ for calculating the emission flow rate by using the differential pressure signal was longer than the pulsation period, it was hard to obtain a correct flow rate of emission, but in the emission flow rate measuring apparatus D of the embodiment, the response frequency of the differential pressure sensor 73 is set higher than the pulsation frequency, and as shown in FIG. 15, since the operation period $T_1$ for calculating the emission flow rate by using the differential pressure signal is shorter than the pulsation period, an accurate flow rate of emission is obtained. The period $T_1$ may be nearly same as the pulsation period.

It is known that, in pulsation, the emission G at pulsation forms a momentary counterflow in the passage 52. Accordingly, in the emission flow rate measuring apparatus D of the embodiment, the emission flow rate is calculated on the basis of the phenomenon that the square root of the differential pressure indicated by the differential pressure signal of the differential pressure sensor 73 is proportional to the emission flow rate, but due to counterflow of the emission G, if the differential pressure indicated by the differential pressure signal of the differential pressure sensor 73 becomes negative, it is designed to calculate the emission flow rate on the basis of the phenomenon that the product of the square root of absolute value of differential pressure indicated by differential pressure signal multiplied by-l is proportional to the emission flow rate.

More specifically, if the differential pressure indicated by the differential pressure signal of the differential pressure sensor 73 is positive, the flow rate is calculated according to formula (6), and negative, the emission flow rate converted to standard state Q(t) [$m^3$/min] is calculated according to formula (7).

That is, if the emission G counterflows, by predetermining the proportion coefficient α, the flow rate of the emission can be obtained from the measured values of temperature and pressure of emission flowing in the passage and the differential pressure of Pitot tube.

The preferred embodiment may be changed and modified in various manners. For example, the diluting gas K is not limited to N2, but other inert gas than $N_2$ or refined air may be used.

The differential pressure sensor 73 is not limited to the device for detecting the differential pressure of static pressure and total pressure at the response frequency higher than the pulsation frequency of the emission while the engine of the automobile 51 is idling, but it may be also designed to detect the differential pressure of static pressure and total pressure at response frequency of higher than the pulsation frequency (for example, 100 Hz) of emission G in all stages from idling state to full throttle state of the engine.

Without using tail pipe attachment 65, the differential pressure type flowmeter 66 and arithmetic processing device 67 may be directly mounted on the exhaust pipe 64 of the automobile. In this case, the passage 52 is composed of the exhaust pipe 64 only.

The differential pressure type flowmeter 66 is not limited to the Pitot tube type flowmeter, but the orifice type flowmeter or Venturi type differential pressure flowmeter may be used.

The Pitot tube 70 is not limited to the double tube structure, but the Pitot tube for detection of total pressure 68 and the Pitot tube for detection of static pressure 69 may be provided separately.

The both first communicating part 71 and second communicating part 72 may not be always required, and only one of them may be provided. The response difference adjusting mechanism 76 may not be provided in both first communicating part 71 and second communicating part 72, but may be provided in one of them only.

The response difference adjusting mechanism 76 is not limited to throttle valve, but buffer tank or capillary may be used and the function of the response difference adjusting mechanism may be realized by adjusting the length of the piping for composing the first communicating part 71 and/or the length of the piping for composing the second communicating part 72. Further, without using response difference adjusting mechanism 76, for example, the total pressure and static pressure may be measured separately, and by using and processing each measured value, the differential pressure may be obtained, and at this time the difference in response time between total pressure and static pressure may be eliminated by adjustment by signal processing.

Instead of installing the arithmetic processing device 67 on the tail pipe attachment 65 together with the differential pressure type flowmeter 66. It may be installed at a position remote from the tail pipe attachment 65 and differential pressure type flowmeter 66 (for example, on the seat of the automobile 51).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An emission flow rate measuring apparatus including a differential pressure gauge for detecting the differential pressure of emission flowing in an emission passage, the apparatus further comprising:

an arithmetic processing unit programmed to resolve the pressure signal by frequency, and correct the flow rate by using a predetermined correction coefficient corresponding to frequency.

2. The emission flow rate measuring apparatus of claim 1 wherein the arithmetic processing unit is further programmed to resolve the pressure signal by frequency and amplitude, and correct the flow rate by using a predetermined correction coefficient corresponding to frequency and amplitude.

3. The emission flow rate measuring apparatus of claim 2 further comprising:

a pulsation generation device provided in an emission passage for generating pressure fluctuations at different frequency and amplitude sequentially in the gas flow;

an arithmatic processing unit for determining a correction coefficient by comparing the flow rate determined from the differential pressure signal detected in a pressure fluctuation generated state and the flow rate of actually flowing gas; and a storage unit for storing the correction coefficient.

4. An emission flow rate measuring apparatus including a total pressure detector and a static pressure detector provided in a passage of emission exhausted from an engine, the apparatus further comprising:

a differential pressure sensor connected to the total pressure detector and static pressure detector, wherein the differential pressure sensor outputs a differential pressure signal at a frequency higher than pulsation frequency of emission and the emission flow rate is calculated from this differential pressure signal.

5. The emission flow rate measuring apparatus of claim 4 wherein the differential pressure sensor is a semiconductor differential pressure sensor.

6. The emission flow rate measuring apparatus of claim 4 wherein a response difference adjusting mechanism is provided between the total pressure detector and differential pressure sensor.

7. The emission flow rate measuring apparatus of claim 4 wherein a response difference adjusting mechanism is provided between the static pressure detector and differential pressure sensor.

8. The emission flow rate measuring apparatus of claim 4 wherein a response difference adjusting mechanism is provided, and wherein the response difference adjusting mechanism is an element from the group consisting essentially of a buffer tank, capillary or throttle valve.

9. The emission flow rate measuring apparatus of claim 4 wherein a communicating part is provided between the differential pressure sensor and one of the other pressure sensors, and this communicating part is formed of a piping of length of 20 m or less and inside diameter of 1.0 to 50 mm.

10. The emission flow rate measuring apparatus of claim 4 wherein the differential pressure indicated by the differential pressure signal is once converted into a flow rate, and is averaged, so that the average flow rate of emission is determined.

11. The emission flow rate measuring apparatus of claim 4 further being constituted as a car-mount type.

12. An emission flow rate measuring apparatus including a total pressure detector and a static pressure detector provided in a passage of emission exhausted from an engine, the apparatus further comprising:

a differential pressure sensor connected to the total pressure detector and static pressure detector, wherein the differential, pressure sensor outputs a differential pressure signal at a frequency higher than pulsation frequency of emission while the engine is idling, and the emission flow rate is calculated from this differential pressure signal.

13. An emission flow rate measuring apparatus including a total pressure detector and a static pressure detector provided in a passage of emission exhausted from an engine, the apparatus further comprising:

a differential pressure sensor connected to the total pressure detector and static pressure detector, wherein when the differential pressure signal of the differential pressure sensor is negative, a backward flowrate is obtained by multiplying the square root of the absolute value of the differential pressure signal by −1.

14. A method for measuring a flow rate of exhaust gases from an engine, wherein the method utilizes a differential pressure type flow meter to obtain a pressure signal, the method further comprising:

resolving the pressure signal by frequency; and correcting the flow rate by using a predetermined correction coefficient corresponding to frequency.

15. The method of claim 14 further comprising:

resolving the pressure signal by frequency and amplitude; and correcting the flow rate by using a predetermined correction coefficient corresponding to frequency and amplitude.

16. The method of claim 15 wherein the correction coefficients are obtained by comparison with the substantial flow rate of gases whose pressure has various frequencies and amplitudes and are applied to flow in a passageway of exhaust gases.

17. A method for measuring a flow rate of exhaust gases, using a total pressure detector and a static pressure detector which are connected to a differential pressure detector and are disposed in a passageway of exhaust gases from an engine, the method further comprising:

obtaining a backward flow rate by multiplying the square root of the absolute value of the differential pressure signal by −1 in the case that the signal value is negative.

* * * * *